US010723172B2

(12) United States Patent
Walls-Bruck et al.

(10) Patent No.: US 10,723,172 B2
(45) Date of Patent: Jul. 28, 2020

(54) RIM FOR A WHEEL

(71) Applicant: Dymag Group Limited, Chippenham (GB)

(72) Inventors: Marcus Walls-Bruck, Chippenham (GB); Michael John Wilson, Chippenham (GB); Christopher Shelley, Chippenham (GB)

(73) Assignee: Dymag Group Limited, Chippenham (GB)

( * ) Notice: Subject to any disclaimer, the term of this patent is extended or adjusted under 35 U.S.C. 154(b) by 662 days.

(21) Appl. No.: 15/270,830

(22) Filed: Sep. 20, 2016

(65) Prior Publication Data

US 2017/0087929 A1    Mar. 30, 2017

Related U.S. Application Data

(63) Continuation of application No. PCT/GB2016/052533, filed on Aug. 16, 2016.

(30) Foreign Application Priority Data

Jun. 14, 2016  (GB) .................................. 1610361.6
Sep. 16, 2016  (DE) .................... 20 2016 105 179 U

(51) Int. Cl.
*B60B 5/02*        (2006.01)
*B60B 21/02*       (2006.01)
(Continued)

(52) U.S. Cl.
CPC .............. *B60B 5/02* (2013.01); *B60B 21/023* (2013.01); *B60B 21/026* (2013.01);
(Continued)

(58) Field of Classification Search
CPC ....... B60B 5/02; B60B 21/104; B60B 21/102; B60B 21/12; B60B 21/023; B60B 21/025; B60B 21/026; B60B 21/028
See application file for complete search history.

(56) References Cited

U.S. PATENT DOCUMENTS 4,294,490 A * 10/1981 Woelfel .................. B29C 53/60
                                                    301/64.703
5,080,444 A    1/1992 Hopkins et al.
(Continued)

FOREIGN PATENT DOCUMENTS

AU    2012101896 A4 * 11/2013
AU    2012101896 A4    11/2013
(Continued)

OTHER PUBLICATIONS

Mar. 10, 2017—(WO) International Search Report and Written Opinion—App. No. PCT/GB2016/052533—14 pages.
Aug. 1, 2016—(GB)—Search Report—App. No. GB1610361.6—4 pages.

*Primary Examiner* — Scott A Browne
(74) *Attorney, Agent, or Firm* — Banner & Witcoff, Ltd.

(57) ABSTRACT

A non-metallic rim for a wheel which may be used for motorised vehicles. The rim has a barrel, a first flange, a second flange, a first bead seat, a second beat seat and a primary structural component. The primary structural component extends into at least the first flange and the barrel, and the primary structural component is capable of bearing the majority of the radial and/or lateral load that is borne by the rim during usage. Additionally, the rim has at least a portion of the first bead seat spaced apart from the primary structural component and/or has a protective insert in between the outer face of the first flange and the primary structural component.

16 Claims, 13 Drawing Sheets

(51) Int. Cl.
  B60B 21/10 (2006.01)
  B60B 21/12 (2006.01)
  B60B 21/04 (2006.01)
  B60B 3/00 (2006.01)

(52) U.S. Cl.
  CPC .......... B60B 21/028 (2013.01); B60B 21/102 (2013.01); B60B 21/104 (2013.01); B60B 21/12 (2013.01); B60B 3/001 (2013.01); B60B 21/04 (2013.01); B60B 2310/318 (2013.01); B60B 2310/321 (2013.01); B60B 2310/323 (2013.01); B60B 2310/52 (2013.01); B60B 2310/80 (2013.01); B60B 2360/341 (2013.01); B60B 2360/344 (2013.01); B60B 2360/3412 (2013.01); B60B 2360/3416 (2013.01); B60B 2360/3418 (2013.01); B60B 2360/36 (2013.01); B60B 2360/362 (2013.01); B60B 2900/212 (2013.01); B60B 2900/311 (2013.01); B60B 2900/321 (2013.01); B60B 2900/3312 (2013.01); B60B 2900/572 (2013.01)

(56) References Cited

U.S. PATENT DOCUMENTS

| | | | |
|---|---|---|---|
| 5,578,154 A | 11/1996 | Britten | |
| 7,309,110 B2 | 12/2007 | Vernet et al. | |
| 7,918,514 B2 * | 4/2011 | Dal Pra' | B60B 5/02 116/208 |
| 8,366,202 B2 * | 2/2013 | Poertner | B60B 5/02 301/95.102 |
| 8,517,068 B2 | 8/2013 | Delfino et al. | |
| D722,935 S | 2/2015 | Dingle et al. | |
| D726,617 S | 4/2015 | Dingle et al. | |
| D726,618 S | 4/2015 | Dingle et al. | |
| D730,796 S | 6/2015 | Dingle et al. | |
| 2008/0265658 A1 * | 10/2008 | Reuteler | B29C 70/345 301/95.102 |
| 2010/0019564 A1 | 1/2010 | Theuer | |
| 2010/0141022 A1 | 6/2010 | Hendel et al. | |
| 2012/0025597 A1 * | 2/2012 | Koshiyama | B60B 1/003 301/95.102 |
| 2012/0049610 A1 | 3/2012 | Lew | |
| 2012/0062021 A1 | 3/2012 | Lew | |
| 2013/0020856 A1 | 1/2013 | Dick et al. | |
| 2013/0026816 A1 | 1/2013 | Kia et al. | |
| 2013/0175849 A1 | 7/2013 | Schmidt et al. | |
| 2014/0175863 A1 | 6/2014 | Dingle et al. | |
| 2014/0191566 A1 | 7/2014 | Burlefinger et al. | |
| 2014/0333121 A1 | 11/2014 | Hufenbach et al. | |
| 2014/0333122 A1 * | 11/2014 | Werner | B29C 70/34 301/95.102 |
| 2014/0346845 A1 | 11/2014 | Renner | |
| 2014/0346847 A1 | 11/2014 | Werner et al. | |
| 2014/0375112 A1 | 12/2014 | Werner et al. | |
| 2015/0076896 A1 | 3/2015 | Werner et al. | |
| 2015/0231917 A1 | 8/2015 | Dressler et al. | |
| 2015/0328922 A1 | 11/2015 | Dingle et al. | |
| 2015/0352897 A1 | 12/2015 | Huidekoper | |
| 2015/0360509 A1 | 12/2015 | Werner et al. | |
| 2015/0367677 A1 | 12/2015 | Pieronek et al. | |
| 2016/0001593 A1 | 1/2016 | Gielisch et al. | |
| 2016/0052335 A1 | 2/2016 | Dingle et al. | |
| 2016/0116427 A1 | 4/2016 | Laurenson | |
| 2016/0159141 A1 * | 6/2016 | Satterthwaite | B60B 21/10 301/55 |
| 2016/0303902 A1 * | 10/2016 | Snyder | B32B 3/26 |

FOREIGN PATENT DOCUMENTS

| | | |
|---|---|---|
| CN | 201353885 Y | 12/2009 |
| CN | 102371842 A | 3/2012 |
| DE | 10006400 A1 | 8/2001 |
| DE | 102007023228 A1 | 11/2008 |
| DE | 102010027048 A1 | 1/2012 |
| DE | 102011077834 A1 | 12/2012 |
| DE | 102012010663 A1 | 12/2012 |
| DE | 102011083834 A1 | 4/2013 |
| DE | 102011086890 A1 | 5/2013 |
| DE | 102012208081 A1 | 11/2013 |
| DE | 102012210469 A1 | 12/2013 |
| DE | 102013202271 A1 | 8/2014 |
| DE | 102013221514 A1 | 4/2015 |
| DE | 102014103269 A1 | 9/2015 |
| DE | 102014211174 A1 | 12/2015 |
| DE | 102014215910 A1 | 2/2016 |
| EP | 0539214 A2 | 4/1993 |
| EP | 1378377 A2 | 1/2004 |
| EP | 1859958 A1 | 11/2007 |
| EP | 2331348 A1 | 6/2011 |
| EP | 2363272 A1 | 9/2011 |
| EP | 2502754 A1 | 9/2012 |
| EP | 2574477 A2 | 4/2013 |
| EP | 2626218 A1 | 8/2013 |
| JP | 2001171303 A | 6/2001 |
| WO | 9301930 A1 | 2/1993 |
| WO | 9709181 A1 | 3/1997 |
| WO | 2010065313 A1 | 6/2010 |
| WO | 2011000070 A1 | 1/2011 |
| WO | 2013083443 A1 | 6/2013 |
| WO | 2013083729 A2 | 6/2013 |
| WO | 2013113594 A1 | 8/2013 |
| WO | 2014016211 A1 | 1/2014 |
| WO | 2014061002 A1 | 4/2014 |
| WO | 2014082115 A1 | 6/2014 |
| WO | 2014198482 A1 | 12/2014 |
| WO | 2015018593 A1 | 2/2015 |
| WO | 2015027271 A1 | 3/2015 |
| WO | 2015028337 A1 | 3/2015 |
| WO | 2015069111 A1 | 5/2015 |
| WO | 2015090275 A1 | 6/2015 |
| WO | 2015106760 A1 | 7/2015 |

* cited by examiner

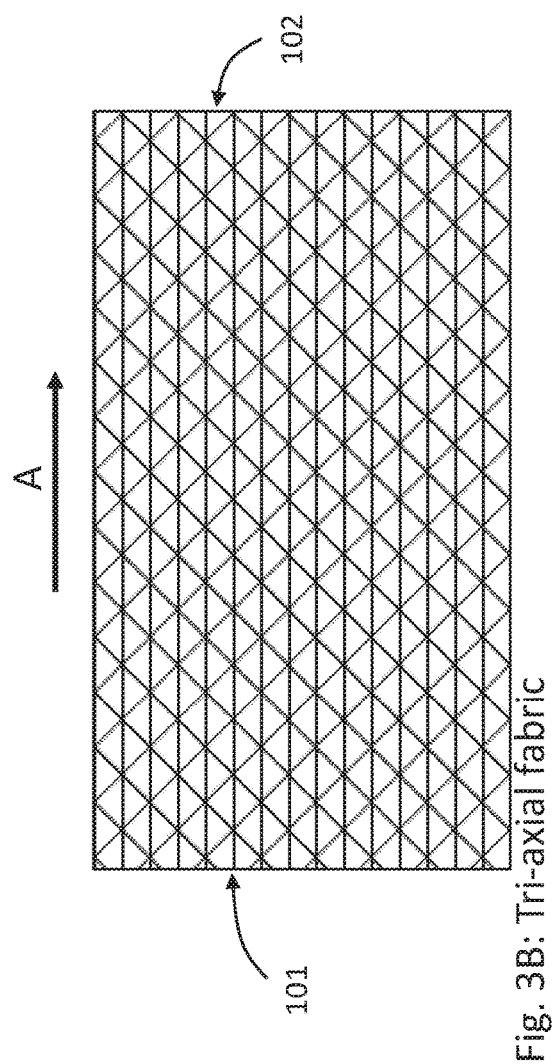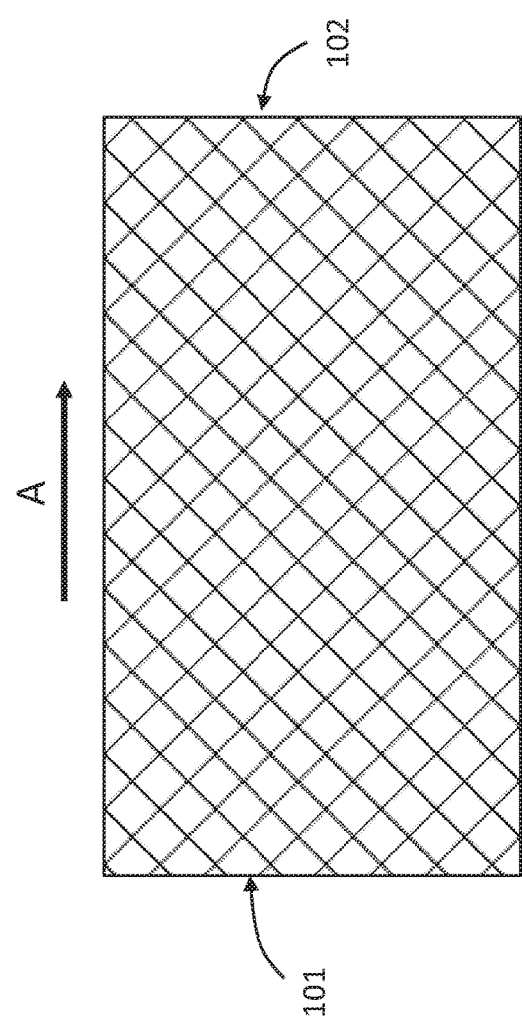
Fig. 3B: Tri-axial fabric
Fig. 3C: Bi-axial fabric

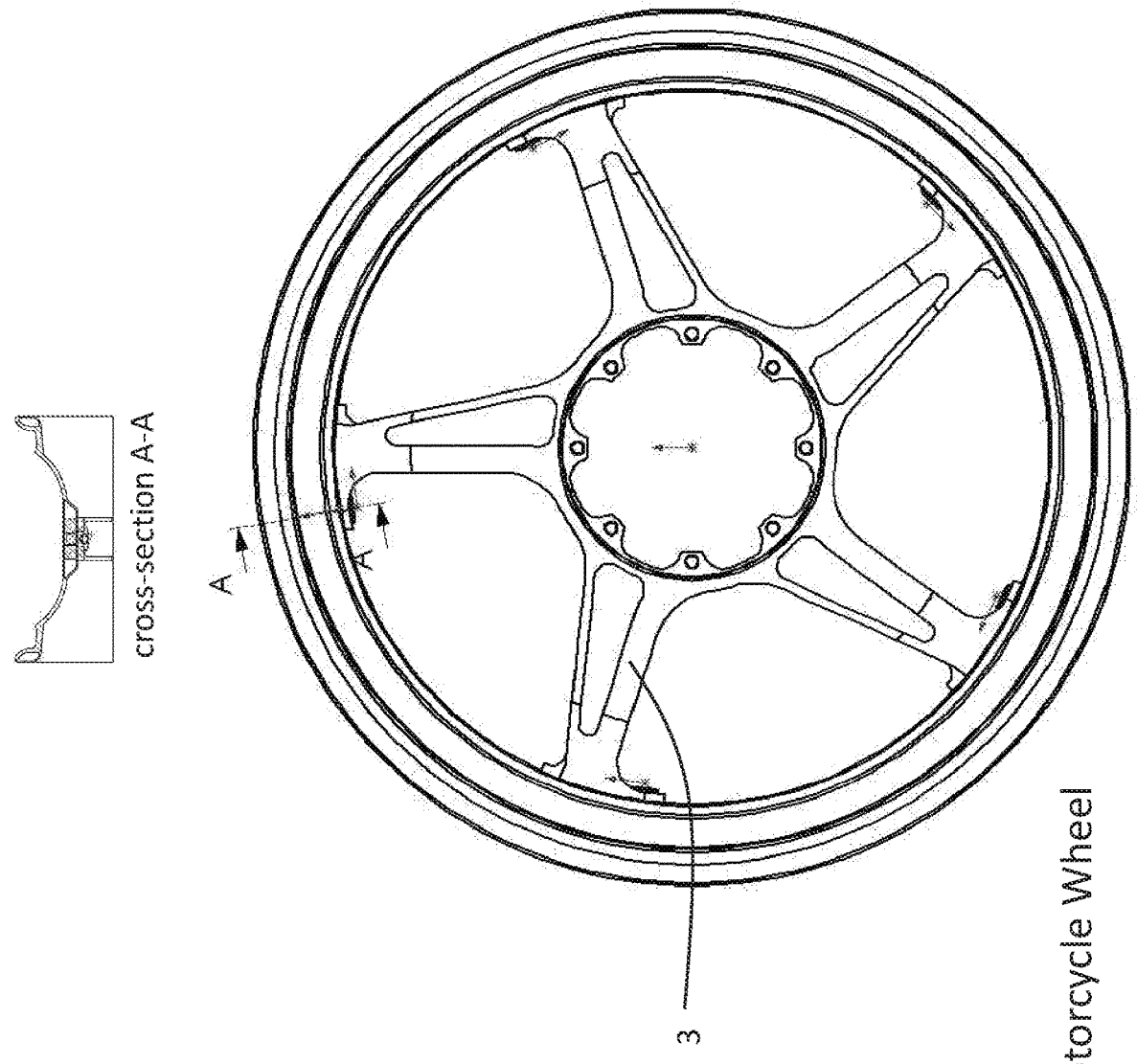
Fig.6 – Motorcycle Wheel

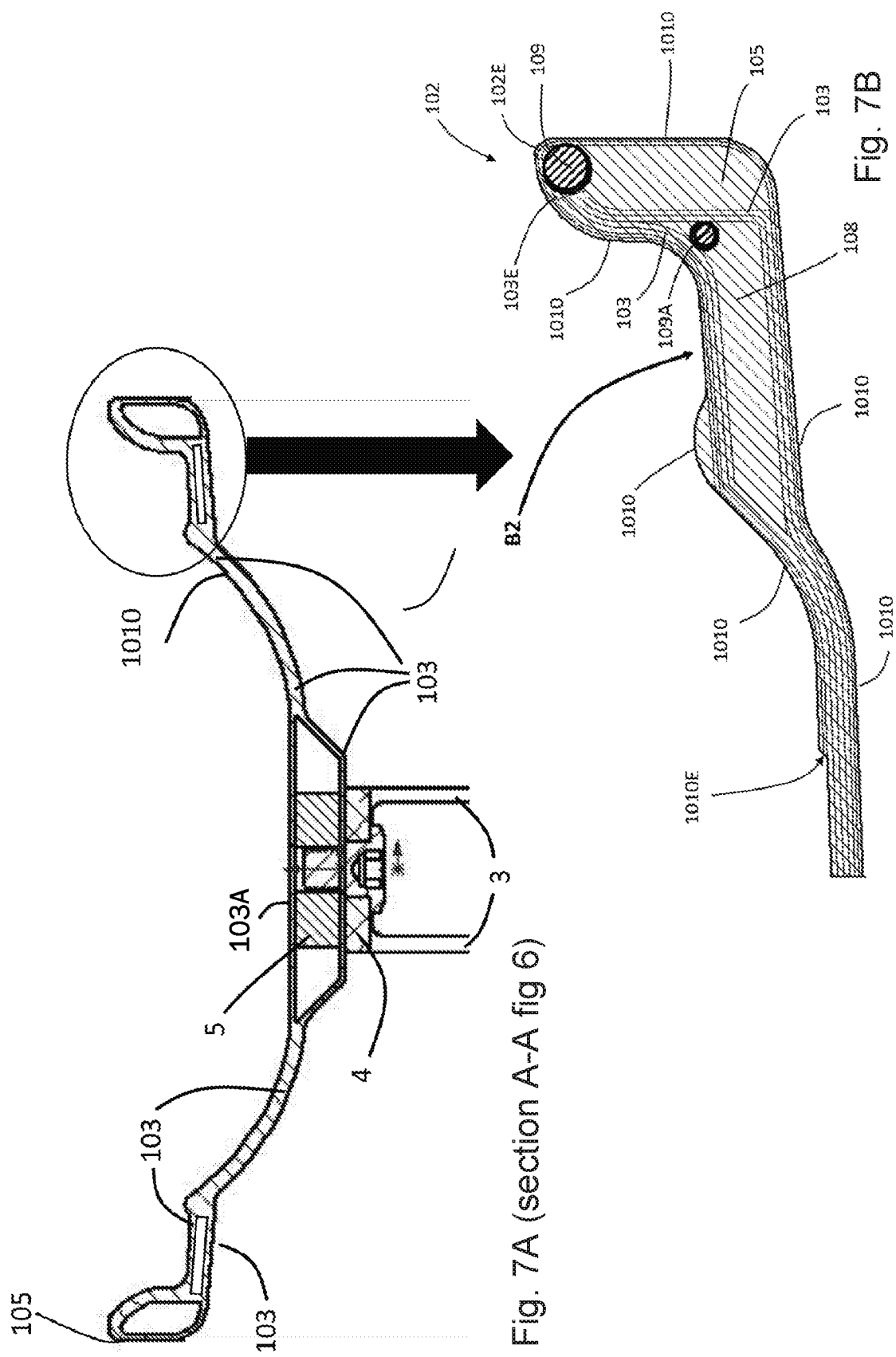

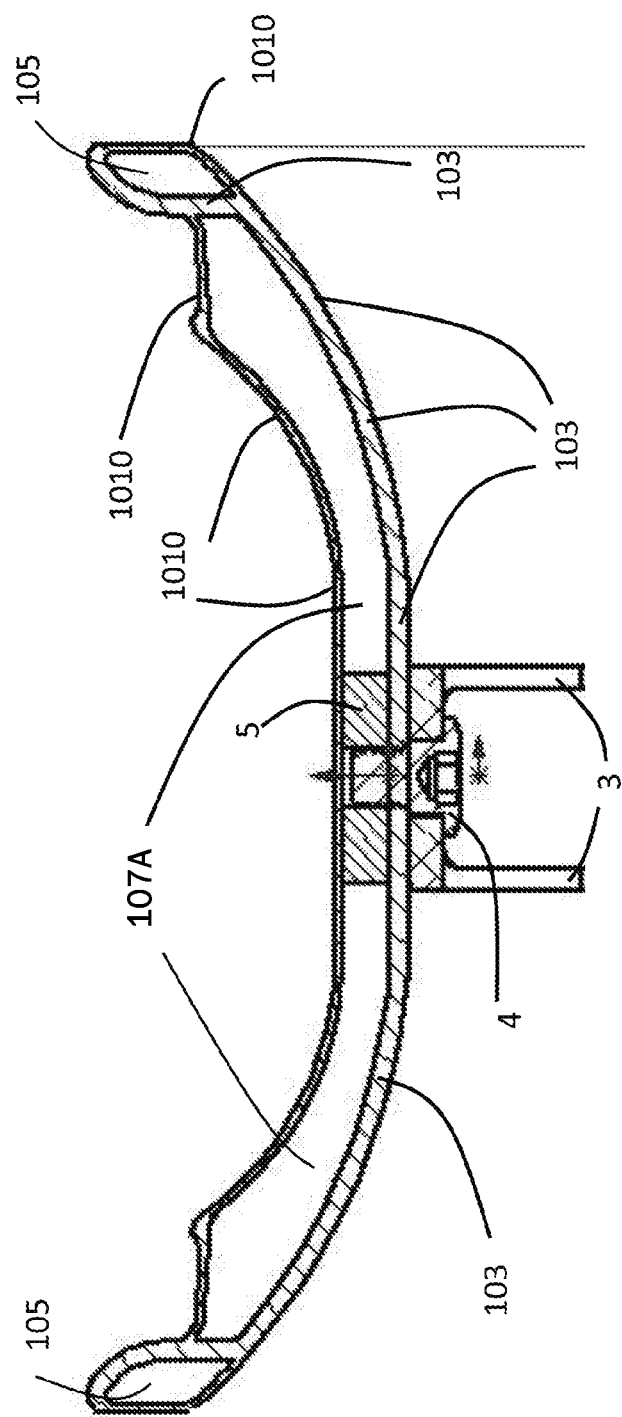
Fig. 8 (section A-A fig 6)

RIM FOR A WHEEL

CROSS REFERENCE TO RELATED APPLICATIONS

This application is a continuation of and claims priority to co-pending PCT application number PCT/GB2016/052533, filed 16 Aug. 2016; which claims priority to GB1610361.6, filed 14 Jun. 2016. This application also claims priority to DE 20 2016 105 179.7, filed 16 Sep. 2016. All of which are hereby incorporated by reference in their entireties for any and all non-limiting purposes.

FIELD OF INVENTION

This application relates to wheels, particularly wheels having a non-metallic rim, such as a rim comprising fibre composite and/or plastic materials. The rims and wheels described herein may, for example, be for use with motorised and non-motorised vehicles such as automobiles, motorcycles, bicycles and aircraft etc.

BACKGROUND

Wheels made from composite materials, such as fibre-reinforced plastics, have made major advances in recent years. However, even recent designs can have certain drawbacks. For example, some wheels that experience very high and/or sudden axial or radial loads or impacts can experience a loss in the structural integrity of the wheel, which can lead to tire deflation and/or a loss of control of a vehicle. This is particularly a concern for automobiles and motorbikes that experience high speeds. Additionally structural damage to a rim can mean the entire rim needs to be replaced, for safety reasons, owing to the difficulty of accurate damage assessment and the lack of easily replaceable elements, rather than simply being repaired. Sometimes, damage can go undetected on rims, which can be a safety problem if the wheels are used on, and then fail on, a vehicle.

SUMMARY OF THE INVENTION

In a first aspect, there is provided a non-metallic rim for a wheel, the rim comprising the following components:

a barrel having first and second flanges extending radially outward from opposing edges of the barrel, and the barrel comprising a first bead seat and a second bead seat arranged axially inwardly, respectively, of the first and second flanges, wherein a primary structural component extends at least through the first flange and the barrel, and optionally the primary structural component being capable of bearing the majority of the radial and/or lateral load that, in use, would be borne by the rim a protective insert is disposed between an outer face of the first flange and the primary structural component and/or at least a portion of the first bead seat is spaced apart from the primary structural component and optionally the primary structural component, bead seat and, if present, the protective insert are bound by a polymer matrix.

In a second aspect, there is provided a wheel comprising a rim of the first aspect.

In a third aspect, there is provided a vehicle comprising a wheel of the second aspect.

In a fourth aspect, there is provided a method for making a rim of the first aspect, the method comprising assembling the primary structural component, bead seat and, if present, the protective insert, and any other optional components of the rim, such as a filler material, and binding them together by a polymer matrix.

The typical design of a prior art rim of a composite wheel is a barrel having two flanges extending radially outward from opposing edges of the barrel. The barrel is generally cylindrical in cross section. Bead seats are normally arranged inwardly of the barrel. The bead seats are surfaces on which the inner rims of a tyre seat onto the wheel. The flanges prevent lateral (i.e. axial) movement of the tyre on the wheel. Generally, commercially available composite wheels have a rim that is integrally formed and contoured to form the flanges, the bead seats and the section of the barrel between the bead seats. The present inventors have found that the transfer of sudden and/or high loads through the bead seat can be one of the causes of a loss in the structural integrity of a wheel. Embodiments of rims described herein reduce the propensity of a composite wheel to suffer from damage from sudden and/or high axial and/or radial loads, while still having a lightweight structure and desired properties that allows their use in high performance situations, in vehicles or aircraft. Additionally, it has been found that damage to the rim in some prior art rims may be undetected or, once detected, has resulted in a major structural defect, resulting in a loss of strength in the rim. Embodiments of the rim described herein allow early detection of damage to a rim, and indication that the rim needs further inspection to determine if the damage is serious and before it worsens and/or can be a safety problem on a vehicle. Furthermore, the rims can be used in Hybrid and MonoBloc wheels, while improving the repeatability of the manufacturing process.

Certain embodiments described herein may have further advantages as follows:

1) A load path that does not follow either the inner or outer surface of the wheel structure throughout. This produces a load path with fewer changes of direction from flange to flange, which reduces the stress concentration points within the load path, resulting in superior mechanical performance, and less tendency to fail when high axial and/or radial loads are imparted to the rim.
2) a filler material, e.g. a foam, may be used to support a bead seat, and the fibrous material over the bead seat may have a fibre orientation that does not significantly increase the flange to flange bending stiffness of the wheel.
3) improved protection of the primary load bearing structure of the wheels under impact and mishandling of the wheel, by use of an sacrificial layer (the protective insert and any overlying layer, e.g. the outer layer described herein) integrated into one or both of the rim flanges, which may be in-board and outboard flanges on an automobile or left- and right-hand flanges on a motorbike wheel.
4) improved absorption and dissipation of loads caused by impacts axially and radially on the flanges of the wheel, which may be in-board and outboard flanges.
5) improved deflection and/or dissipation of energy on impact to the rim reduce the tendency for crack propagation to the primary structural component, e.g. from an outer layer.
6) improved visible detection of damage to integrated sacrificial layer that that indicates a need to inspect wheel for damage and remove from service.

7) remote detection by use of an embedded electronic alarm detection system for damage to the sacrificial layer system integrated into the sacrificial layer that that indicates a need to inspect wheel for damage and remove from service
8) an engineered 3D fibre layered material manufactured in circular hoop sections to replace foam, which also improves stiffness and impact resistance.

This application details the design, construction and manufacturing process to incorporate these safety features into wheel, for example, a fibre reinforced MonoBloc or hybrid moulded type wheel.

BRIEF DESCRIPTION OF THE FIGURES

FIG. 3B shows, schematically, a triaxial fabric for use in the primary structural component, when viewed from a radial direction, with one of the axes of the fibres of the fabric being parallel to the axial direction, i.e. running along a flange-to-flange direction (A—from the first flange to the second flange).

FIG. 3C shows, schematically, a biaxial fabric for use in the outer layer, e.g. as part of the bead seat, when viewed from a radial direction, with neither of the axes of the fibres of the fabric being parallel to the axial direction, i.e. running along a flange-to-flange direction (from the first flange to the second flange). Each axis of the fabric is at an angle of about 45° to the flange-to-flange direction (or axial direction A).

FIG. 6 and FIG. 7A show, respectively, a front view (as viewed along an axial direction) and a cross-sectional view (along section A-A of FIG. 6) of a multicomponent Hybrid wheel, which can be used for a motorcycle.

FIG. 7B shows an enlarged view of the flange on the right hand side of the wheel of FIG. 7A.

FIG. 8 shows a cross-section of a further embodiment rim of FIG. 6, which is also a multicomponent Hybrid wheel, which can be used for a motorcycle.

DETAILED DESCRIPTION

Figure 1:
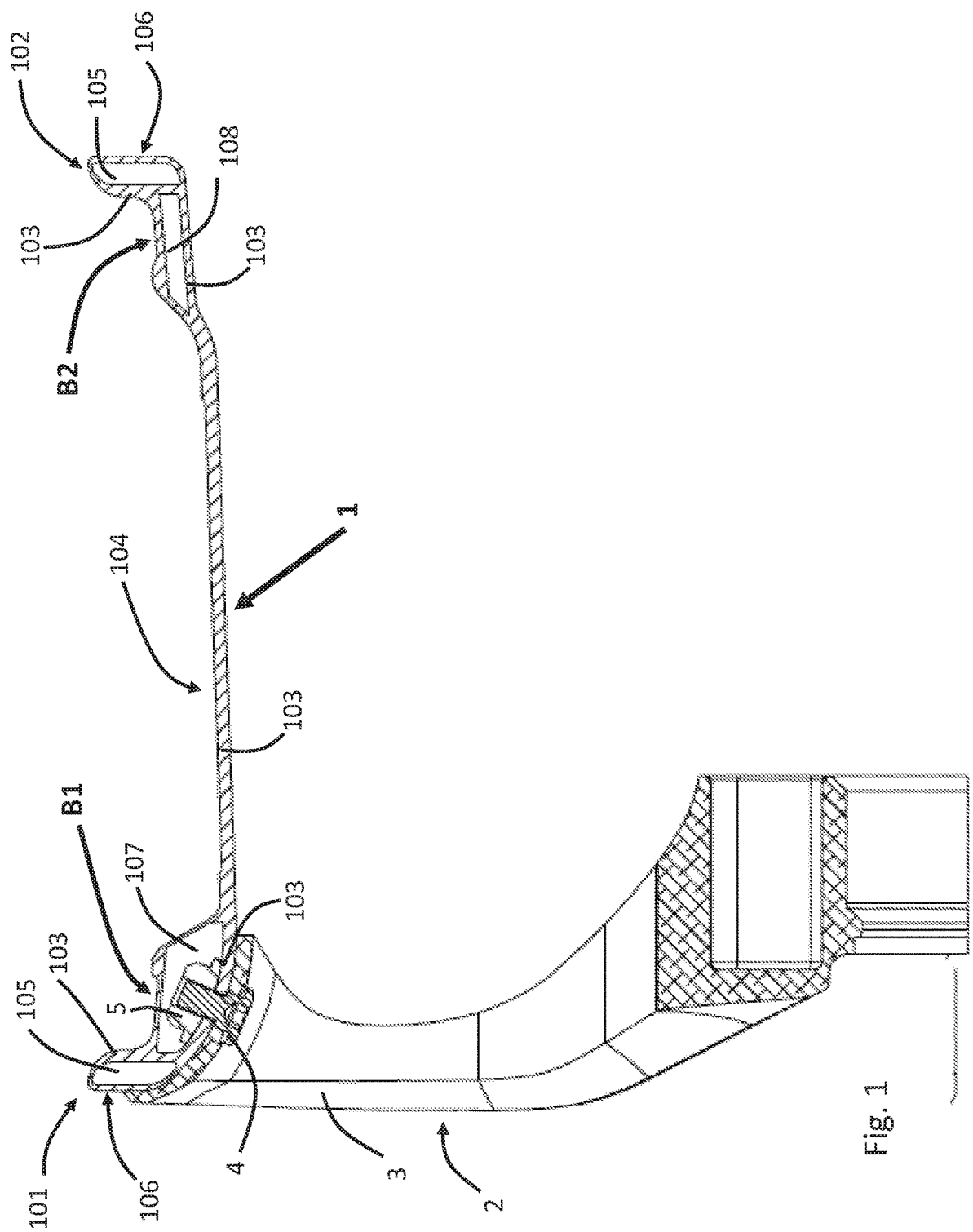
FIG. 1 shows a cross-sectional view of an embodiment of a rim when incorporated into a Hybrid Wheel for an automobile.

Optional and preferred features are described below. Any optional or preferred feature may be combined with any aspect of the invention and any other optional or preferred feature.

A non-metallic rim may be defined as a rim made primarily (i.e. at least 50% by volume, optionally at least 70% by volume, optionally at least 90% by volume) from non-metallic components, e.g. fibre reinforced plastics, rather than an alloy, such as steel, or aluminium- or magnesium-based alloys. The non-metallic rim may nevertheless comprise metallic components, such as attachment means, as desired.

The rim may be for use with and included in various types of wheel, such as one-piece MonoBloc and multi-piece Hybrid Wheels. A wheel including the rim may be for use in the automotive or aerospace industry, e.g. for automobiles and aircraft, respectively. They may also be used for other types of vehicles, including, but not limited to motorbikes and bicycles.

Disclosed herein are wheels that may comprise one or more of the rims as disclosed herein. A wheel may comprise the rim and a center member. The center member may be disposed radially inward from the rim. The center member may comprise a disk, a spider or spokes. The center member may be disposed centrally, along the axis of the rim, with respect to first and second flanges or disposed closer to one flange of the rim than the other. For a wheel for a four-wheeled vehicle, such as an automobile, the center member may be disposed closer to one edge or flange of the rim (which may be associated with the outboard flange) than the other. For a motorbike wheel, the center member may be disposed centrally with respect to the first and second flanges.

A one piece MonoBloc moulded composite wheel (hereafter referred to as "MonoBloc" Wheel) may be defined a wheel in which the spokes and a rim (or barrel) are physically joined during assembly manufacture to produce a single piece rim/spoke construction, to which certain metallic/non-metallic components and hub inserts can be added, fastened or embedded, if desired, to resolve various well known technical issues associated with wheels. The fibres of the spoke section of a one-piece Monobloc wheel are physically intertwined or embedded in the rim/barrel during construction and/or the spoke and rim are bound together by the same polymer matrix.

A multi-piece Hybrid Wheel (hereafter known as "Hybrid" Wheel), may be defined as a wheel in which the rim (or barrel) is constructed using fibre reinforced and/or plastic materials as a single piece, onto which a separately constructed spoke and hub section is separably fastened or bonded with mechanical attachment means. Hybrid Wheels as mentioned herein may include wheels with:
a. metallic spoked or disc centrepieces, which may be cast or machined from metals suitable for wheel production.
b. fibre reinforced and/or plastic spoked or disc centrepieces, which may be laid-up, or moulded and/or machined from non-metallic materials.

For both types of 1) MonoBloc and 2) a&b multi-piece Hybrid Wheels, there are 3 types of moulding processes that may be used on production of the rim/barrel and/or spoke sections which use one or more of the following generic manufacturing processes:
1. Pre-impregnated fibre materials (known hereafter as "Pre-Preg" materials), in which the resin is pre-impregnated into fibre materials or cloths. These Pre-Preg materials are placed into the open or closed mould dies, after which the materials are heat cured in an autoclave or other out-of-autoclave oven/heating system, which can be integrated into the die tools.
2. Wet lay-up (known hereafter as "Wet Lay-Up") in which dry fibre materials are placed into a die and impregnated using automated or manual resin applicators prior to closing the mould for curing.

3. Resin Transfer Moulding (known hereafter as "RTM") methods in which the dry fibre material is placed into a mould(s) tool, which is then closed and liquid resin is injected under pressure to impregnate the material in the tool. The tool is heated to cure the resin post injection.

In each case, metallic and non-metallic inserts, fasteners and other materials such as but not limited to Aramid, ceramics, structural foams may be used to enhance the mechanical performance and provide assembly/fastening points for the wheels, and the attachment to the vehicle. Sensors and visual indicators may embedded or added prior, during or after the wheel or rim moulding process.

In all three manufacturing processes, the MonoBloc or Hybrid wheel/barrel/rim is removed from the tool (or mould) after the resin has cured, and may be then further processed, trimmed and assembled into a completed wheel and finished/coated ready for fitment to the vehicle.

In an embodiment, the rim described herein may be incorporated into or form part of fibre reinforced MonoBloc or Hybrid composite/plastic wheel rim (or barrel) section manufactured by any one or a combination of the 3 primary Pre-Preg, Wet Lay-Up or RTM manufacturing processes.

In an embodiment, the invention comprises a design and construction method to protect the primary composite load path in the highly vulnerable outer and inner rim areas of the wheel structure from lateral and radial impact damage by the use of a secondary sacrificial structure incorporating impact resistant materials.

As described herein, the primary load path is the path through which most of the radial and/or axial load will be borne by the rim, in use. It will typically pass through the primary structural component as described herein. In an embodiment, the primary load path does not follow the internal bead seat or external rim flange throughout the area most vulnerable to radial and/or lateral impacts. The primary load path may be sandwiched between one or more layers of high impact materials to provide physical protection to—and transmit load away—from the impacted area to a wider area, thereby dissipating impact energy over a wider surface area and reduce shear and lateral stress in the load path.

In an embodiment, a secondary and therefore sacrificial component of the structure (e.g. the protective insert) can be incorporated into the rim during the manufacturing process and is not intended to be a separately manufactured or removable component.

The rim may incorporate visual and/or electronic indication of damage to the wheel that can potentially exceed the safe maximum loading for the wheel, requiring inspection and possible replacement of the damaged MonoBloc or Hybrid wheel.

The rim may include a visual and/or electronic sensor system to be located in the section of the rim adjacent to, but not part of the primary load path.

In an embodiment, in a rim for a Hybrid wheel:
1) The rim may incorporate metallic inserts accurately located into filler material (e.g. foam) of the rim section to facilitate the accurate location of fasteners to assemble the spoke or disc section to rim/barrel, in the primary load path that is separated from the bead seat by structural foam.
2) The Invention ensures that the fastener through the primary load path is encased in a solid layer of composite materials in the bead seat area that does not enter the airspace of the tyre, and therefore does not require secondary air sealing.

In an embodiment, the primary structural component is capable of bearing the majority of the radial and/or lateral load that, in use, would be borne by the rim. In an embodiment, when the primary structural component comprises fibres, this may be indicated by at least some of the structural fibres (e.g. at least 25% by number, optionally at least 30% by number) of the primary structural component extending through the primary structural component in a direction parallel to an axial direction, when the primary structural component is viewed from a radial direction. In an embodiment, the primary structural component being capable of bearing the majority of the radial and/or lateral load that, in use, would be borne by the rim is indicated by the primary structural component being capable of bearing a maximum load (in N) of at least 50% in an radial or axial direction of the rim with other components of the rim (i.e. non-primary structural components, such as the protective insert and/or the filler material, and any overlying layer thereon) removed.

As described herein, there is provided a non-metallic rim for a wheel, the rim comprising:
  a barrel having first and second flanges extending radially outward from opposing edges of the barrel, and the barrel comprising a first bead seat and a second bead seat arranged axially inwardly, respectively, of the first and second flanges,
  wherein
    a primary structural component extends at least through the first flange and the barrel, and optionally the primary structural component being capable of bearing the majority of the radial and/or lateral load that, in use, would be borne by the rim
    a protective insert is disposed between an outer face of the first flange and the primary structural component and/or
    at least a portion of the first bead seat is spaced apart from the primary structural component and
    optionally the primary structural component, the first and/or second bead seat and, if present, the protective insert are bound by a polymer matrix.

In an embodiment, there is provided a non-metallic rim for a wheel, the rim comprising:
  a barrel having first and second flanges extending radially outward from opposing edges of the barrel, and the barrel comprising a first bead seat and a second bead seat arranged axially inwardly, respectively, of the first and second flanges,
  wherein
    a primary structural component extends at least through the first flange and the barrel, and the primary structural component being capable of bearing the majority of the radial and/or lateral load that, in use, would be borne by the rim
    a protective insert is disposed between an outer face of the first flange and the primary structural component and/or
    at least a portion of the first bead seat is spaced apart from the primary structural component and
    the primary structural component, first and/or second bead seat and, if present, the protective insert are bound by a polymer matrix.

Preferably, the primary structural component extends through the first flange, the barrel and the second flange. In an embodiment, a protective insert is disposed between an outer face of the second flange and the primary structural component and/or at least a portion of the bead seat nearest the second flange is spaced apart from the primary structural component.

In an embodiment, the protective insert is disposed between an outer face of the first flange and the primary structural component and at least a portion of the first bead seat is spaced apart from the primary structural component.

In an embodiment, the protective insert is disposed between an outer face of the second flange and the primary structural component and at least a portion of the bead seat nearest the second flange is spaced apart from the primary structural component.

In an embodiment, the rim is for a wheel suitable for a four-wheeled vehicle, such as an automobile, and first flange is an outboard flange. Accordingly, there is also provided a wheel for a four-wheeled vehicle, such as an automobile, and first flange is an outboard flange.

In an embodiment, the rim is for a wheel suitable for a four-wheeled vehicle, such as an automobile or car, and first flange is an inboard flange. Accordingly, there is also provided a wheel for a four-wheeled vehicle, such as an automobile, and first flange is an inboard flange.

In an embodiment, the rim is for a wheel suitable for a two-wheeled vehicle, which may be a motorised vehicle, such as a motorbike. In an embodiment, the rim is for a wheel suitable for a two-wheeled vehicle, which may be a non-motorised vehicle, such as a bicycle.

In an embodiment, e.g. in a two-wheeled vehicle, the first flange and second flange have the same description as one another. In an embodiment, e.g. in a two-wheeled vehicle, the first flange and the second flange are substantially symmetrical versions of one another.

The wheel may be a MonoBloc wheel or a multi-piece Hybrid wheel.

In an embodiment, the primary structural component comprises, in the first flange a substantially vertical section, wherein a 'vertical' direction corresponds to a direction substantially perpendicular to an axial direction defined by the barrel. Optionally, above the substantially vertical section is a section that curves outwardly toward a top outward edge of the first flange. Optionally, below the substantially vertical section is a section that curves underneath the first bead seat toward the section of the primary structural component that extends into the barrel.

In an embodiment, the protective insert is disposed between the outer face of the first flange and the substantially vertical section of the primary structural component.

In an embodiment, the primary structural component comprises, in the second flange a substantially vertical section, wherein a 'vertical' direction corresponds to a direction substantially perpendicular to an axial direction defined by the barrel. Optionally, above the substantially vertical section is a section that curves outwardly toward a top outward edge of the second flange. Optionally, below the substantially vertical section is a section that curves underneath the second bead seat toward the section of the primary structural component that extends into the barrel.

Optionally, the primary structural component comprises structural fibres. Optionally at least some of the structural fibres extend through the primary structural component in a direction from the first flange along an axis defined by the rim, when viewed from a radial direction. As described herein, if fibres extend along or are parallel to a particular direction, the fibres may be at an angle not greater than 20° from that direction, optionally at an angle not greater than 15° from that direction, optionally at an angle not greater than 10° from that direction, optionally at an angle not greater than 5° from that direction, optionally at an angle not greater than 3° from that direction, optionally at an angle not greater than 1° from that direction, optionally exactly parallel to that direction.

The structural fibres may be selected from carbon, aramid and glass fibres.

In an embodiment the structural fibres form a fabric. The structural fibres may have been woven, knitted, stitched, braided, wound, stapled or otherwise bound into a fabric. In an embodiment, the structural fibres may have been bound by other fibres and/or a polymer (before being bound by the polymer matrix to form the rim). At least some of the structural fibres may be aligned with one another, e.g. in a biaxial or triaxial fabric, or may be randomly orientated with respect to one another. In the primary structural component, preferably at least some of the fibres are aligned with one another, e.g. in a biaxial or triaxial fabric, and, preferably at least some of the fibres are orientated in a flange-to-flange direction (as will be described in more detail below). The structural fibres may have been formed into a 3D (three-dimensional) material, e.g. a material in which the fibres are orientated in three dimensions, e.g. formed in a 3D weaving process or a 3D braiding process.

In an embodiment, the structural fibres are biaxially or tri-axially woven. A biaxially woven fabric may be defined herein as a fabric having two sets of fibres woven at an angle to each other, which may be at an angle of 90° to one another. A tri-axially woven fabric may be defined herein as a fabric having three sets of fibres, with each set woven in a different orientation to one of the other sets, e.g. a first set at 0°, a second set at +60° to the first set and a third set at −60° to the first set. The triaxial fabric may comprise structural fibres orientated in three directions, as described herein, and may optionally further include further fibres, e.g. structural fibres, in a fourth direction, which may be woven in with or sewn into the other fibres. This can aid the manufacturing process.

In an embodiment, the rim comprises an outer layer also bound by the polymer matrix, wherein the outer layer forms the bead seat and/or a covering on the first protective insert. The outer layer may be defined as a layer disposed over at least part of the primary structural component, optionally with one or more further components disposed between the outer layer and the primary structural component. Optionally, the outer layer forms the outermost layer on the rim, e.g. with no further layers disposed on it. In an alternative embodiment, one or more further layers may be present over the outer layer.

In an embodiment, the outer layer comprises structural fibres.

In an embodiment, the outer layer and the primary structural component each comprise at least one fabric layer comprising structural fibres, and optionally the primary structural component comprises a greater number of fabric layers than the outer layer.

In an embodiment, the outer layer and the primary structural component each comprise a plurality of fabric layers (e.g. at least two fabric layers) comprising structural fibres, and optionally the primary structural component comprises a greater number of fabric layers than the outer layer. Optionally, the primary structural component comprises two or more fabric layers comprising structural fibres, optionally three or more, optionally four or more fabric layers comprising structural fibres.

In an embodiment, at least some of the structural fibres of the primary structural component extend through the primary structural component in a direction substantially parallel to an axis defined by the rim.

In an embodiment, the outer layer substantially lacks fibres that extend through the primary structural component in a direction substantially parallel to an axis defined by the rim.

In an embodiment, the primary structural component comprises a triaxial woven fabric and the outer layer comprises a biaxial woven fabric. The biaxial fabric and triaxial fabric described herein are preferably formed from carbon fibres.

In an embodiment, the primary structural component, first and/or second bead seat and, if present, the protective insert(s) in the first and/or second flange, and, if present, the filler materials disposed between the bead seat and the primary structural component are bound by a polymer matrix. The polymer matrix may comprise a polymer selected from a thermoplastic and a thermoset polymer. The polymer matrix may comprise polymer selected from an epoxy resin (EP), a polyester resin (UP), a vinyl ester resin (VE), a polyamide resin (PA), polyether ether ketone (PEEK), bismaleimides (BMI), polyetherimide (PEI) and benzoxazine.

The protective insert may act to protect the primary load structure from an impact applied radially and/or axially to the rim. In an embodiment the protective insert may act to absorb and/or deflect and/or dissipate energy from a load or impact applied axially and/or radially to a rim. In an embodiment, the protective insert acts to deflect and/or dissipate energy from an impact to the rim (e.g. axially and/or radially) and reduce the tendency for crack propagation to the primary structural component, e.g. from an outer layer.

In an embodiment, the protective insert comprises a shock-absorbing material, which may be selected from a foam, a honeycomb, a laminate structure, and a fabric. The foam may be an open- or closed-cell foam. The foam may comprise a foamed polymer, which may be selected from a foamed polyacrylamide, such as polymethylacrylimide, a foamed polyurethane, a foamed polystyrene, a foamed vinyl chloride, a foamed acrylic polymer, a foamed polyethylene, a foamed polypropylene and a foamed vinyl nitrile. In an embodiment, the protective insert comprises an elastomeric polymer, such as rubber, which may be a synthetic rubber, such as styrene butadiene, or natural rubber. The elastomeric polymer may or may not be foamed.

The protective insert may extend at least part way, optionally all the way, circumferentially, around the rim.

The protective insert may have a density, as measured by ASTM D 1622, of at least 10 kg/m$^3$, optionally at least 20 kg/m$^3$, optionally at least 30 kg/m$^3$, optionally at least 40 kg/m$^3$. The protective insert may have a density, as measured by ASTM D 1622, of 120 kg/m$^3$ or less, optionally 110 kg/m$^3$ or less, optionally 75 kg/m$^3$ or less, optionally 60 kg/m$^3$ or less. The protective insert may have a density, as measured by ASTM D 1622, of from 10 kg/m$^3$ to 120 kg/m$^3$, optionally from 20 kg/m$^3$ to 120 kg/m$^3$, optionally from 30 kg/m$^3$ to 120 kg/m$^3$, optionally from 40 kg/m$^3$ to 80 kg/m$^3$, optionally from 40 kg/m$^3$ to 60 kg/m$^3$, optionally from 40 kg/m$^3$ to 80 kg/m$^3$.

The protective insert may have a compressive strength, as measured according to ASTM D 1621, of at least 0.1 MPa, optionally at least 0.2 MPa, optionally at least 0.3 MPa, optionally at least 0.4 MPa, optionally at least 0.5 MPa, optionally at least 0.6 MPa, optionally at least 0.7 MPa, optionally at least 0.8 MPa, optionally at least 0.9 MPa. The protective insert may have a compressive strength, as measured according to ASTM D 1621, of 5 MPa or less, optionally 4 MPa or less, optionally 3 MPa or less, optionally 2 MPa or less, optionally 1.5 MPa or less, optionally 1 MPa or less. The protective insert may have a compressive strength, as measured according to ASTM D 1621, of from 0.1 MPa to 5 MPa, optionally from 0.3 MPa to 4 MPa, optionally from 0.4 MPa to 4 MPa, optionally from 0.7 MPa to 3.5 MPa, optionally from 0.7 MPa to 2 MPa, optionally from 0.7 MPa to 1.5 MPa, optionally from 0.7 MPa to 1.3 MPa.

Example of foams that may be used for the protective insert include closed-cell polymethacrylimide foams, which are available, for example, from Rohacell®, such as Rohacell® IG and IG-F foams.

In an embodiment, the protective insert comprises a plurality of layers. In an embodiment, the plurality of layers may have different stiffness to one another, e.g. different elastic modulus from one another. In an embodiment, the protective insert comprises a plurality of layers, with the layers arranged axially with respect to one another (i.e. such that in a cross-section of the rim (e.g. in a manner shown in FIG. 1, 2 or 3) layers are seen between the protective insert and the outer layer). In an embodiment, the protective insert comprises a plurality of layers, and has a first layer disposed closer to the primary structural component than a second layer and the first layer has a higher stiffness (a higher Young's modulus) than the second layer. In an embodiment, three or more layers are provided, the layers arranged axially in the rim, with respect to one another, with the stiffness of the layers (i.e. the Young's modulus of the layers) becoming progressively lower in the direction axially from the primary structural component to the outer surface of the flange in which they are located, e.g. the first and/or second flange. Having less stiff inserts toward an outer face of the flange will assist in spreading loads from an impact over a large area, i.e. forming a crumple zone and decreasing the likelihood of damage to the primary structural component.

In an embodiment, the outer layer overlies the protective insert in the first and/or second flange, the outer layer having a different colour to the protective insert or any materials that may be disposed between the outer layer and the protective insert, to provide a visual indication of any damage to the outer layer. The protective insert and/or any materials that may be disposed between the outer layer and the protective insert may be brightly coloured (e.g. having a colour such as white, green or yellow, a fluorescent colour or a primary colour or any combination of primary colours).

The outer layer covering the protective insert on the first and/or second flange, when viewed from an axial direction A, may lack fibres that are aligned with a radial direction R, i.e. the fibres of the outer layer may be orientated such that they are at an angle (e.g. at least 20° from the radial direction), when viewed from an axial direction A.

In an embodiment, filler material is disposed in at least a portion of the rim defined by space between the first and/or second bead seat and the primary structural component. The filler material may extend at least part way, optionally all the way, circumferentially, around the rim. The filler material may be protective material and may be the same as or different from the material in the protective insert. The filler material may be a foam, a honeycomb, a laminate structure, and a fabric. The foam may be an open- or closed-cell foam. The foam may comprise a foamed polymer, which may be selected from a foamed polyacrylamide, such as polymethylacrylimide, a foamed polyurethane, a foamed polystyrene, a foamed vinyl chloride, a foamed acrylic polymer, a foamed polyethylene, a foamed polypropylene and a foamed vinyl nitrile. In an embodiment, the protective insert comprises an elastomeric polymer, such as rubber, which may be a synthetic rubber, such as styrene butadiene, or natural rubber. The elastomeric polymer may or may not be foamed.

The filler material may have a density, as measured by ASTM D 1622, of at least 10 kg/m$^3$, optionally at least 20 kg/m$^3$, optionally at least 30 kg/m3, optionally at least 40 kg/m$^3$. The filler material may have a density, as measured by ASTM D 1622, of 120 kg/m$^3$ or less, optionally 110 kg/m$^3$ or less, optionally 75 kg/m$^3$ or less, optionally 60 kg/m$^3$ or less. The filler material may have a density, as measured by ASTM D 1622, of from 10 kg/m$^3$ to 120 kg/m$^3$, optionally from 20 kg/m$^3$ to 120 kg/m$^3$, optionally from 30 kg/m$^3$ to 120 kg/m$^3$, optionally from 40 kg/m$^3$ to 80 kg/m$^3$, optionally from 40 kg/m$^3$ to 60 kg/m$^3$, optionally from 40 kg/m$^3$ to 80 kg/m$^3$.

The filler material may have a compressive strength, as measured according to ASTM D 1621, of at least 0.1 MPa, optionally at least 0.2 MPa, optionally at least 0.3 MPa, optionally at least 0.4 MPa, optionally at least 0.5 MPa, optionally at least 0.6 MPa, optionally at least 0.7 MPa, optionally at least 0.8 MPa, optionally at least 0.9 MPa. The filler material may have a compressive strength, as measured according to ASTM D 1621, of 5 MPa or less, optionally 4 MPa or less, optionally 3 MPa or less, optionally 2 MPa or less, optionally 1.5 MPa or less, optionally 1 MPa or less. The filler material may have a compressive strength, as measured according to ASTM D 1621, of from 0.1 MPa to 5 MPa, optionally from 0.3 MPa to 4 MPa, optionally from 0.4 MPa to 4 MPa, optionally from 0.7 MPa to 3.5 MPa, optionally from 0.7 MPa to 2 MPa, optionally from 0.7 MPa to 1.5 MPa, optionally from 0.7 MPa to 1.3 MPa.

Example of foams that may be used for the filler material include closed-cell polymeth-acrylimide foams, which are available from Rohacell®, such as Rohacell® IG and IG-F foams.

In an embodiment, an attachment component for attaching a spoke of a wheel to the rim is embedded in the filler material. In an embodiment, the attachment component is a nut or a bolt. In an embodiment, the attachment component is a nut and an aperture is provided in the primary structural component to allow insertion of a bolt into the nut.

In an embodiment, a filling component is disposed in the rim, e.g. in the first flange and/or second flange and/or under the first and/or second bead seat, the filling component running at least part way around the circumference of the rim in the first flange and/or second flange, respectively. In an embodiment, a filling component is disposed adjacent an end of the primary structural component in the first flange and/or second flange, the filling component running at least part way around the circumference of the rim in the first flange and/or second flange, respectively.

In an embodiment, the filling component comprises a substantially unidirectional fibrous material extending in a circumferential direction around the rim. The fibrous material may be entwined together, e.g. braided together, and may form a rope. The fibrous material may comprise structural fibres, which may or may not be the same type of structural fibres used in the primary structural component or outer layer. The structural fibres in the filling component may comprise fibres selected from carbon, aramid and glass fibres.

In an embodiment, the primary structural component, in the first or second flange, splits in the area under the bead seat and/or in the area in the barrel, and a filler material is located in the cavity formed by the split. If the primary structural component splits in an area under or near the bead seat, a portion of the primary structural component disposed most radially outward may form part of the bead seat, e.g. together with the outer layer, and the filler material may be located between this portion and a portion of the primary structural component located most radially inward.

In an embodiment, one or more sensors is/are provided in or adjacent to the protective insert and/or in the between the bead seat and the primary structural component, to send a signal to a receiver with information about the rim or any tire disposed thereon.

In an embodiment, the sensor or sensors send(s) information to a receiver about any damage to the protective insert and any layer covering the protective insert.

In an embodiment, the sensor or sensors may pass real time telemetric or electronic information via a wireless or hard wired system to the vehicle motoring system.

In an embodiment, the wheel may be inspected with by the use of specialist Non-Destructive Test (NDT) inspection system and/or equipment.

In an embodiment, the sensor may detect a structural failure or damage to the protective insert and/or an overlying outer layer and insert indicating a need for inspection of the rim by an expert, while the primary structural component is minimally damaged or undamaged.

The sensor may be multi or single channel detector that enables the degree of damage to the protective insert and/or any overlying outer layer of the rim to be remotely assessed.

Non-limited embodiments of the present invention will now be described with reference to the Figures. An individual feature mentioned below may be combined individually, and without reference to any associated features, with any of the aspects described here or other optional and preferred features described herein.

FIG. 1 shows a cross sectional view of an embodiment of the rim 1 in a Hybrid type wheel 2. In this embodiment, the rim 1 is screwed to the spokes 3 by means of a bolt 4, which is held in place by a fastener insert, i.e. nut 5. A first flange 101 constitutes an outboard flange of the rim, i.e. the flange that would be outermost when the wheel is installed on a four-wheeled vehicle. A second flange 102 constitutes an inboard flange, i.e. the flange that would be innermost when the wheel is installed on a four-wheeled vehicle. A first bead seat B1 is arranged axially inward of the first flange 101. A second bead seat B2 is arranged axially inward of the second flange 102. The bolt 4 may be a metallic component. The insert 5 may drilled and tapped after the wheel has been fully cured and removed from the mould.

A primary structural component 103 extends through the first flange 101, the barrel 104, and the second flange 102. The primary structural component is capable of bearing the majority of the radial and/or lateral load that, in use, would be borne by the rim.

A protective insert 105 is disposed between an outer face 106 of the first flange and the primary structural component 103.

The horizontal section of the bead seat B1 nearest the first flange (the first bead seat) is spaced apart from the primary structural component 103. A filler material 107 is disposed in the cavity formed by the first bead seat B1 and the underlying primary structural component. The filler material 107 acts to hold the fastener insert 5 in place.

A protective insert 105 is disposed between an outer face 106 of the second flange 102 and the primary structural component 103. A filler material 108 is disposed in the cavity formed by the split primary structural component under the second bead seat B2 and primary structural component 103 in the bead seat B2 and runs to the left side of energy absorbing insert 105 to re-join above in section 103V above noodle 109A.

The primary structural component 103, the bead seat(s) B1, B2 and the protective insert 105 are bound by a polymer matrix. The primary structural component and the bead seats preferably comprise structural fibres impregnated by the polymer matrix, i.e. the primary structural component and the bead seats are fibre-reinforced plastics. The protective inserts may or may not have been impregnated with the polymer matrix, e.g. if they comprise a foam, depending on whether or not this is an open-celled or close-celled foam, they but are bound to the other components by the polymer matrix.

Figure 2:
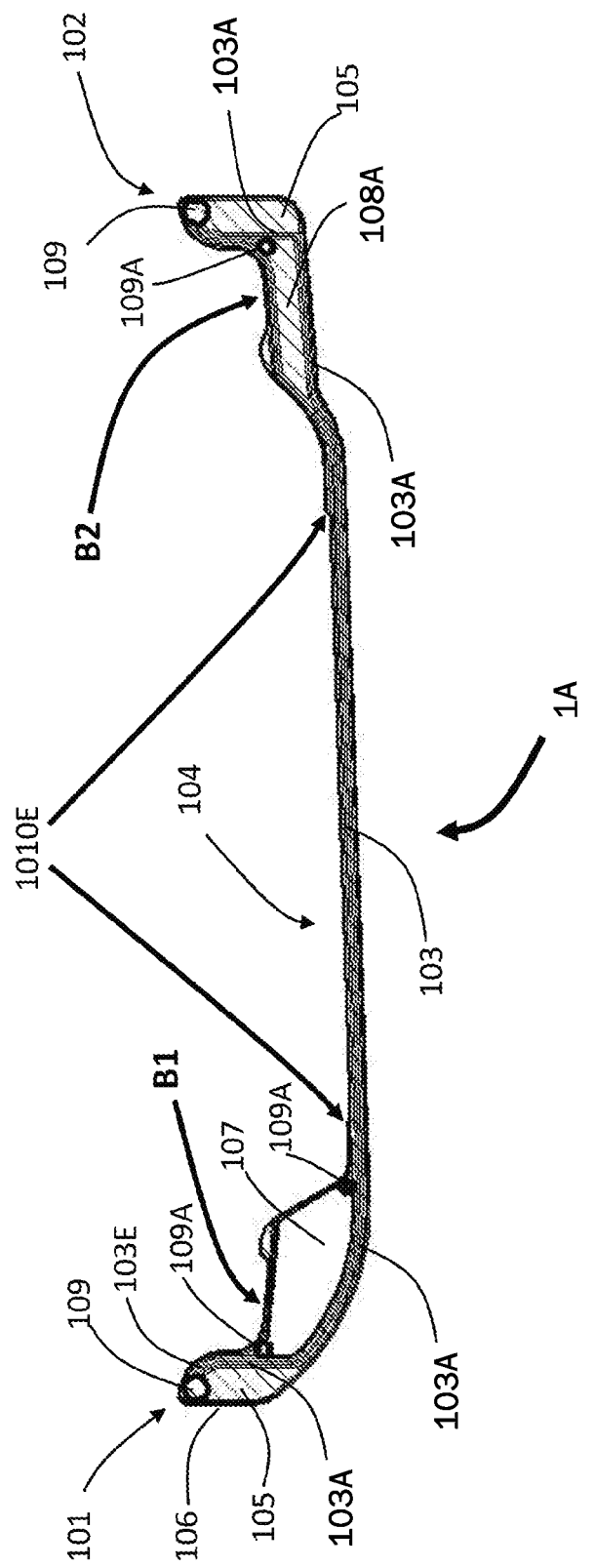
FIG. 2 shows a cross-sectional view of an embodiment of a rim as described herein for use in an automobile wheel, with the outboard flange to the left hand side and the inboard flange to the right hand side of the Figure.

FIG. 2 shows a cross-sectional view of an embodiment of a rim 1A as described herein for use in an automobile wheel 2, with the outboard flange 101 to the left hand side and the inboard flange 102 to the right hand side of the Figure. This rim is similar to the rim of FIG. 1, except that the fastener insert is not present and further components are illustrated. This rim may be for use in a MonoBloc wheel, and integrally formed with the spokes (not shown). All components of FIG. 1 are similarly numbered in FIG. 2. In FIG. 2, a filling component 109 is disposed adjacent an end of the primary structural component in the first flange, the filling component 109 running around the circumference of the rim in the first flange. The filling component 109 may otherwise be termed a noodle herein. The filling component 109 may for example comprise a substantially unidirectional fibrous material extending in a circumferential direction around the rim, e.g. a braided fibrous material, e.g. comprising structural fibres as described herein. The filling component 109 can be placed as shown to ensure accurate fibre material placement (e.g. of the primary structural component) and prevent movement during the manufacturing process, e.g. during an RTM process. The filling component 109 also acts to prevent damage to the end of the primary structural component by dissipating forces along the noodle fibres. Suitable noodles are braided carbon fibre noodles, available commercially, for example from Cristex®.

Further noodles 109A may be disposed underneath the material 1010 forming the bead seat at the point it changes direction. The outboard flange area has been found to more vulnerable to high localised bending loads due to the junction with the spoke and fastener system. The structural voids in areas where the primary and secondary load path split and can initiate or propagate a delamination are filled using the further noodles (109A), thus reducing the tendency to cause delamination.

Figure 3A:
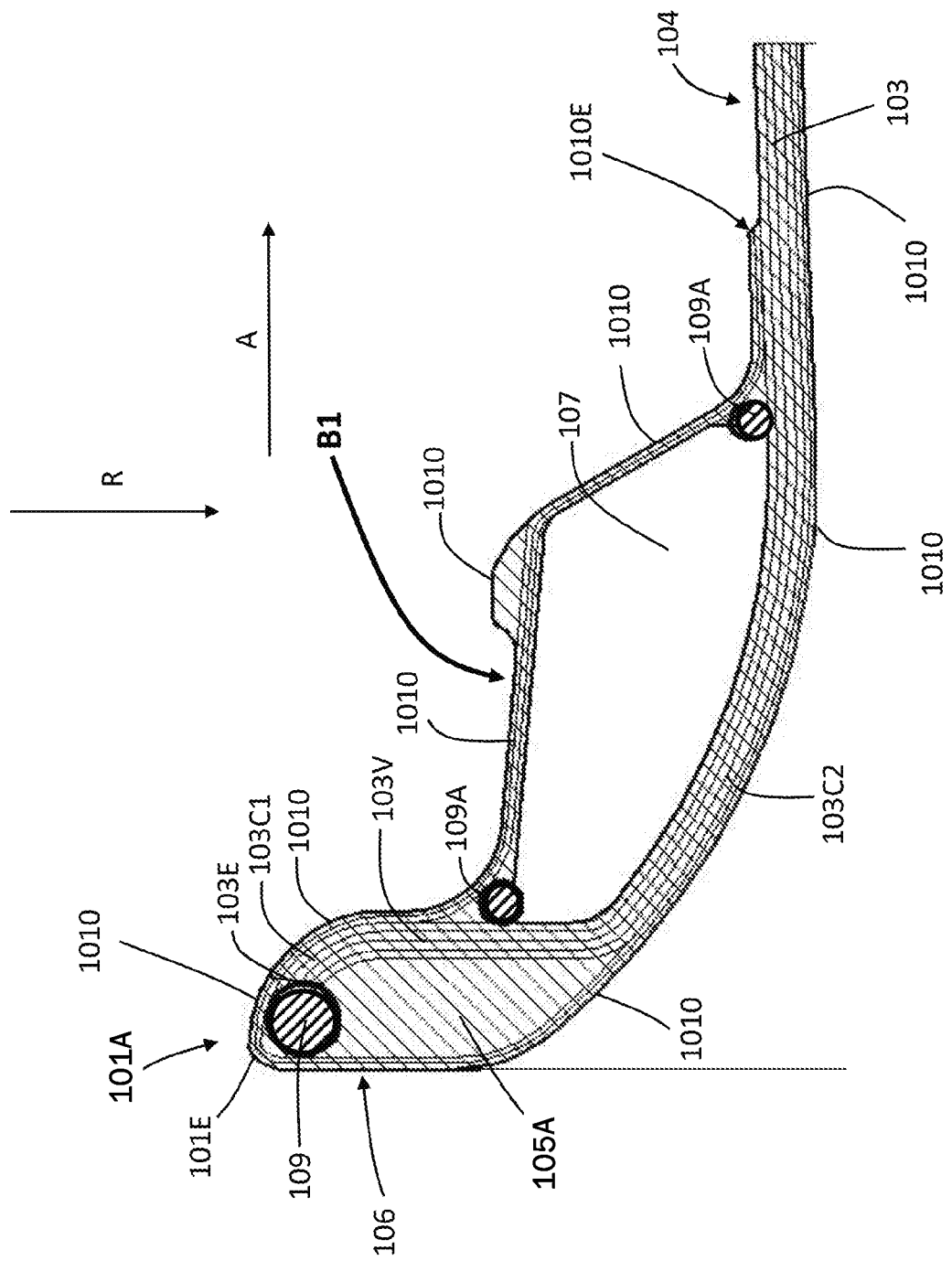
FIG. 3A shows a close-up, cross-sectional view of the outboard flange of the rim of FIG. 2.

It can be seen in FIG. 3A that the primary structural component 103 comprises, in the first flange 101A a substantially vertical section 103V, wherein a vertical direction V corresponds to a direction R substantially perpendicular to an axial direction A defined by the barrel. The direction R may also be termed the radial direction herein. Above the substantially vertical section 103V is a section of the primary structural component 103C1 that curves outwardly toward a top outward edge 101E of the first flange. Below the substantially vertical section 103V is a section 103C2 that curves underneath the bead seat B1 toward the section of the primary structural component 104 that extends into the barrel 104. The protective insert 105A may be disposed between the outer face of the first flange 106 and the substantially vertical section 103V of the primary structural component 103.

In FIG. 3A, it can be seen that the primary load path (formed by the primary structural component) is sandwiched centrally between by a combined sacrificial layer (the protective insert 105A and overlying outer layer 1010) on one side and a structural core (the filler material 107) on the opposite side. This ensures an optimised load carrying and minimises stress raisers, which can occur in wheels where the primary load path runs under/through the bead seat.

In the embodiment shown in the Figures, the primary structural component 103 or 103A comprises structural fibres. In this embodiment, the structural fibres are woven carbon fibres. Preferably, the primary structural component comprises a plurality of layers of woven carbon fibres. The structural fibres may be biaxially or tri-axially woven.

In this embodiment, the rim comprises an outer layer 1010 also bound by the polymer matrix. The outer layer 1010 extends over the entire inside of the barrel (i.e. the side closest to the axis of the rim), over each top outward edge 101E, 102E of both the flanges 101A, 102, and extends axially inward from each of the flanges to form the bead seats B1, B2, with the edge 1010E of the outer layer finishing on the barrel 104. As can be seen, the outer layer 1010 forms a covering on the protective insert 105 and over the filler material 107. In this embodiment, the outer layer 1010 comprises biaxial structural fibres, which are woven into a layer. Preferably, in this embodiment, the outer layer 1010 and the primary structural component 103 each comprise a plurality of fabric layers comprising structural fibres, the primary structural component comprising a greater number of fabric layers than the outer layer, and the fabric layers of the primary structural component are substantially triaxial fabric.

In the primary structural component 103 or 103A at least some of the structural fibres of the primary structural component extend through the primary structural component in a direction substantially parallel to an axis defined by the rim, when viewed from a radial direction R. In other words, at least some of the structural fibres extend through the rim from the first flange to the second flange along the shortest path between them (e.g. as shown in FIG. 3B schematically). In FIGS. 1, 2 and 3A, this would be in the same plane as the page, and along the lines shown in the first structural component. When the primary structural component comprises a biaxial or triaxial woven fabric, then the fabric is aligned such that one of the axes of the fibres extends along the flange-to-flange direction, i.e. along the axial direction of the rim.

FIG. 3B shows, schematically, a triaxial fabric for use in the primary structural component 103, when viewed from a radial direction R, with one of the axes of the fibres of the fabric being parallel to the axial direction, i.e. running along a flange-to-flange direction (from the first flange to the second flange).

Preferably, the outer layer 1010 substantially lacks fibres that extend through the outer layer in a direction substantially parallel to an axis defined by the rim, when viewed from a radial direction R. In other words, the outer layer substantially lacks fibres that extend from the first flange to the second flange along the shortest path between them. When the outer layer comprises a biaxial fabric, for example, the fabric is aligned so that neither the axes of the fibres are along a flange-to-flange direction. Each axis of the fibres is preferably aligned such that there is an angle of at least 30° between the flange-to-flange direction and either of the two axes of the fibres in the biaxial fabric. For example, the outer layer may be a biaxial fabric and the fibres are orientated at about +/−45° to the flange-to-flange direction.

In an embodiment, the primary structural component comprises at least one layer of structural fibres woven into a triaxial fabric and one of the axes of the fibres extends along the flange-to-flange direction, i.e. along the axial direction of the rim, when viewed from a radial direction R, and the outer layer 1010 comprises at least one layer of structural fibres woven into a biaxial fabric and aligned so that neither the axes of the fibres in the biaxial fabric are along a flange-to-flange direction, i.e. along the axial direction of the rim, when viewed from a radial direction R.

FIG. 3C shows, schematically, a biaxial fabric for use in the outer layer, e.g. as part of the bead seat, when viewed from a radial direction, with neither of the axes of the fibres of the fabric being parallel to the axial direction, i.e. running along a flange-to-flange direction (from the first flange to the second flange). Each axis of the fabric is at an angle of about 45° to the flange-to-flange direction (or axial direction A).

As mentioned, preferably, the primary structural component comprises a triaxial fabric and the outer layer comprises a biaxial fabric and the axes of the fabric may be orientated as described above. The triaxial fabric may comprise structural fibres orientated in three directions, as described herein, and may optionally further include further fibres, e.g. structural fibres, in a fourth direction, which may be woven in with or sewn into the other fibres. This can aid the manufacturing process.

In the embodiments shown in the Figures, the protective insert 105 or 105A comprises a foam, which may be a closed or open-cell foam, formed from a suitable material such as a polymethacrylimide (PMI) foam.

In the embodiment of FIGS. 1, 2 and 3A, the outer layer 1010 overlies the protective insert 105 or 105A on an outerface of the first and second flanges. The outer layer has a different colour to the protective insert or any materials that may be disposed between the outer layer and the protective insert. In many fibre-reinforced wheels, damage to any of the components may go unnoticed, since they are often of a dark colour and any cracks or chips to the material may not be readily visible. However, by including a different colour below the outer layer, this allows damage to be detected at an early stage. This provide a visual indication of any damage to the outer layer, and allows for any damage to be addressed. By locating the primary structural component on the opposite side of the protective from the outer layer, and having the damage to the outer layer easily visibly, it means the point at which damage is visible is generally before damage has occurred to the primary structural component.

In the embodiment of FIGS. 1, 2 and 3A, a filler material 107 is disposed in a cavity formed by the bead seat and the underlying primary structural component. In this embodiment, the filler material is a foam. The foam may or may not be the same as the foam used in the protective insert.

As seen in FIG. 1, an attachment component for attaching a spoke of a wheel to the rim is embedded in the filler material. The attachment component can be preassembled into the filler material 107 during the rim manufacturing process, e.g. prior to die closing and an RTM injection process.

Figure 4:
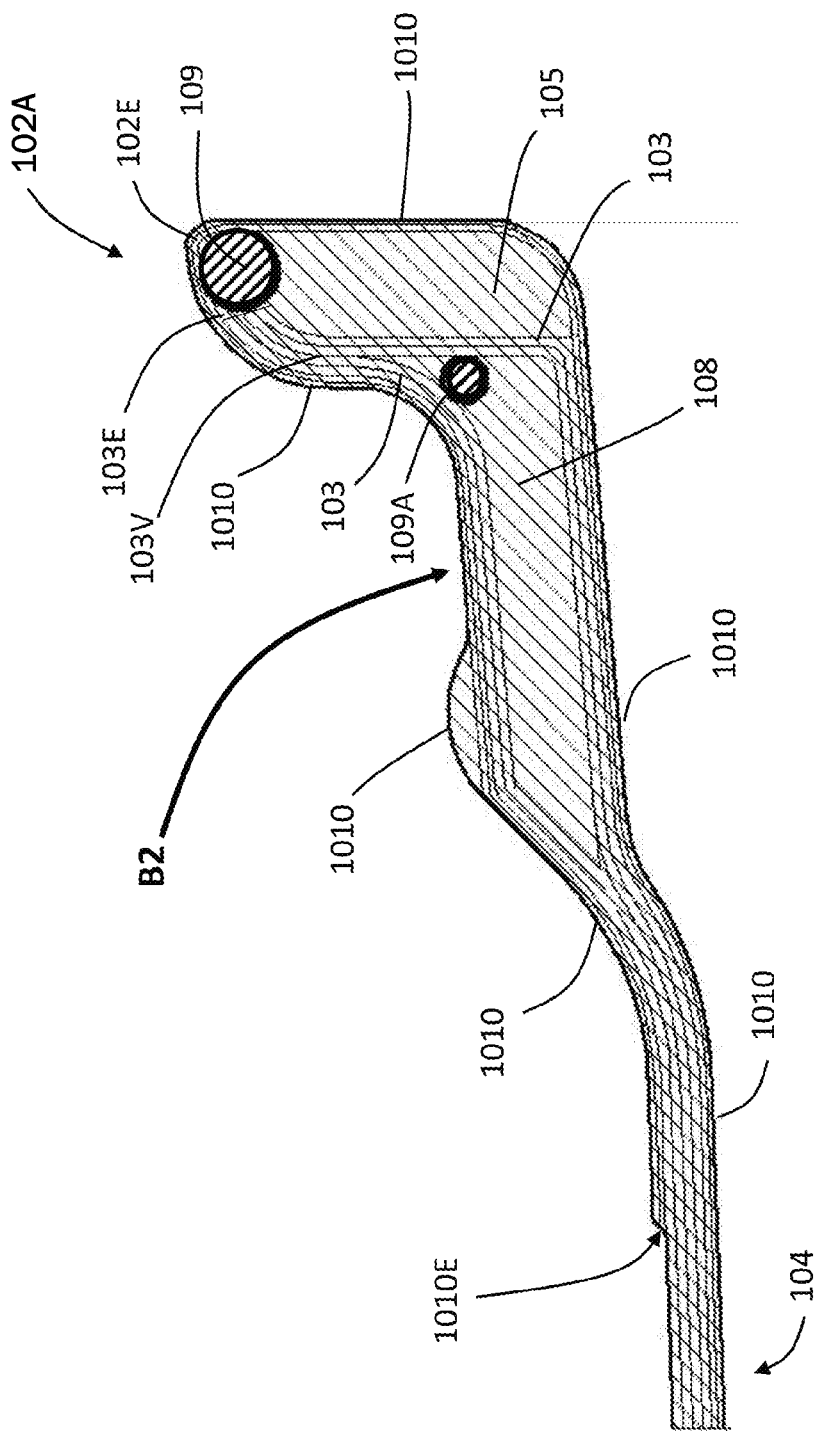
FIG. 4 shows a close-up, cross-sectional view of the inboard flange of the rim of FIG. 2.

FIG. 4 shows a close-up, cross-sectional view of the inboard flange 102A of the rim of FIG. 2. The features of this flange are similarly numbered as the first flange. The arrangement is very similar to the first flange except that the primary structural component splits in the area under the bead seat, and a filler material 108 is located in the cavity formed by the split. The outer layer 1010 extends over the primary structural component on the bead seat over the top edge 102E of the flange and the outer edge of the flange overlying the protective insert 105. The outer layer 1010 extends underneath the barrel of the rim from the first flange to the second flange 1010. As can be seen a noodle 109, e.g. structural fibres braided together, is located at the end 102E of the primary structural component within the inboard flange 102A. Again, the noodle (109) is placed as shown to ensure accurate fibre material placement during manufacture and prevent movement during an RTM process. The noodle 109 forms an integral part of the combined impact resistance/sacrificial layer, 1010, and insert 105. A further noodle 109A is located at the upper point of the split in the primary structural component 103.

In an embodiment, the outer layer 1010 comprises two layers of a plain weave biaxial carbon fibre material, the primary structural component comprises four or five layers of tri-axial woven carbon fibre material, the protective inserts and the filler material comprise a closed-cell foam, e.g. formed from polymethacrylimide, and the noodles comprise braided carbon-fibre material. The fibres in the primary structural component are orientated so that one of the axes of the fibres is aligned along the flange-to-flange direction (e.g. as shown schematically in FIG. 3B). The fibres of the biaxial plain weave in the outer layer 1010 are orientated so that both axes are at an angle of about 45° to the flange-to-flange direction (e.g. as shown schematically in FIG. 3C).

The outer layer 1010 covering the protective insert 105 or 105A on all flanges B1, B2 shown in the Figures herein, when viewed from an axial direction A, will lack fibres that are aligned with a radial direction R, i.e. the fibres of the outer layer are orientated such that they are at an angle (e.g. at least 20° from the radial direction), when viewed from an axial direction A.

Figure 5A:
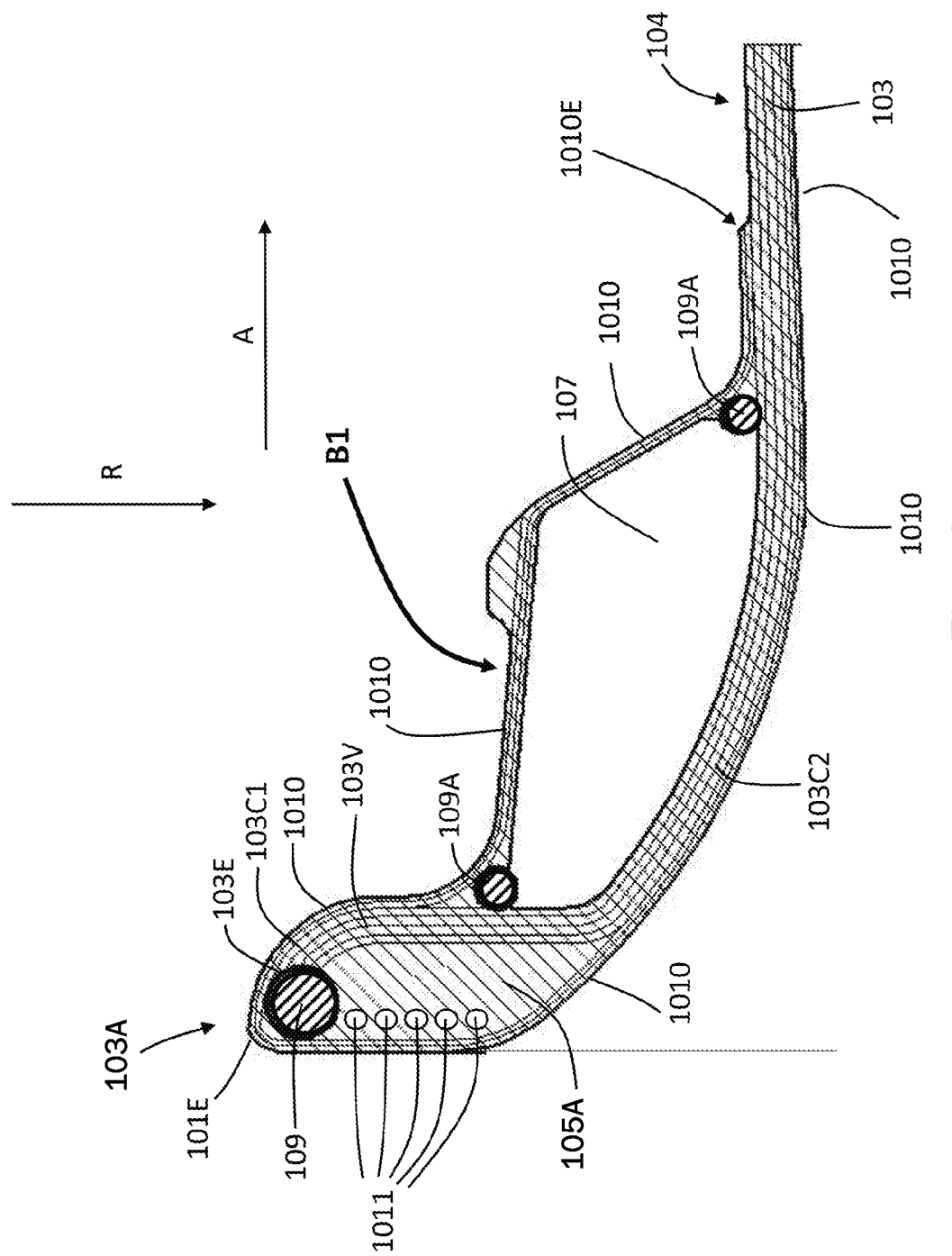
FIGS. 5A and 5B show, respectively, embodiments of the first and second flanges with sensors located in the protective insert.
Figure 5B:
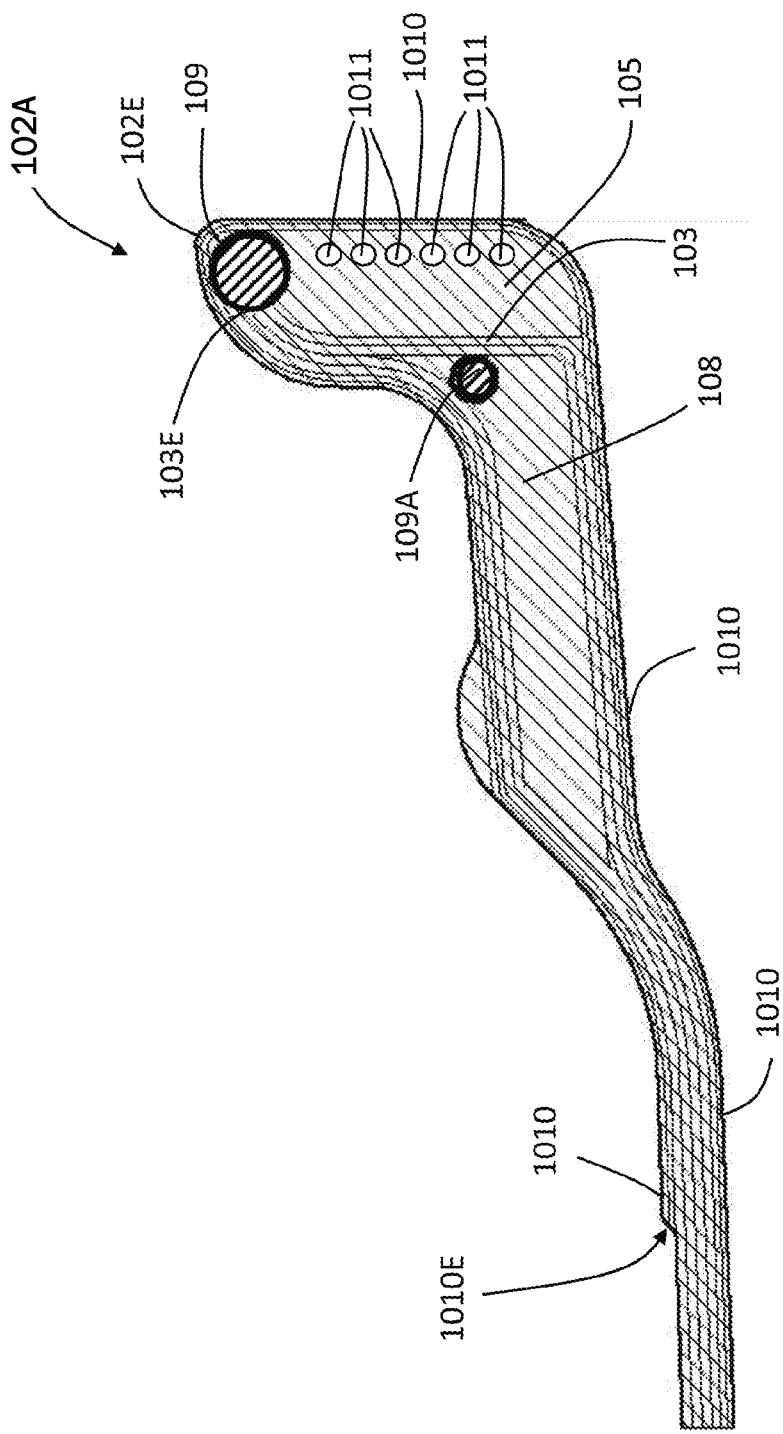

FIGS. 5A and 5B show, respectively, first and second flanges with one or more sensors 1011 located in the protective insert. The individual or multiple sensors may send a signal or signals to a receiver with information about the rim and/or any tire disposed thereon. The sensor(s) 1011 may act to detect any damage to the outer layer and/or the protective insert.

FIG. 6 shows a front view (as viewed along an axial direction) of a multicomponent Hybrid wheel, which can be used for a motorcycle. FIG. 7A shows a cross-sectional view (along section A-A of FIG. 6) of an embodiment of the rim of the wheel of FIG. 6. FIG. 7B shows an enlarged view of the flange on the right hand side of the wheel of FIG. 7A. The wheel differs from that of FIG. 1 in that the spokes 3 are located centrally between the two flanges, rather than closer to one flange than the other. The construction of both of the flanges of this wheel is similar to that of the inbound flange B2 wheel in FIG. 4. The features of FIGS. 7A and 7B corresponding to those in flange B2 in FIG. 4 are given the same numbers. As can be seen in FIG. 7B, the primary structural component splits in the area under the bead seat B2, and a filler material 108 is located in the cavity formed by the split. The outer layer 1010 extends over the primary structural component on the bead seat over the top edge 102E of the flange and the outer edge of the flange overlying the protective insert 105. The outer layer 1010 extends underneath the barrel of the rim from the first flange to the second flange 1010. As can be seen a noodle 109, e.g. structural fibres braided together, is located at the end 103E of the primary structural component within the inboard flange 102. Again, the noodle (109) is placed as shown to ensure accurate fibre material placement during manufacture and prevent movement during an RTM process. The noodle 109 forms an integral part of the combined impact resistance/sacrificial layer, 1010, and insert 105. A further noodle 109A is located at the upper point of the split in the primary structural component 103.

The primary structural component splits in the central portion of the barrel, and a fastener insert, i.e. nut 5, is located in the cavity, which may be held in place by a filler material 107 (not shown). The rim 1 or 1A is screwed to the spokes 3 by means of a bolt 4 that screws into the nut 5.

FIG. 8 shows a cross-section of a further embodiment rim of FIG. 6, which is also a multicomponent Hybrid wheel, which can be used for a motorcycle. In this embodiment, the wheel differs from that of FIG. 1 in that the spokes 3 are located centrally between the two flanges, rather than closer to one flange than the other. The construction of both of the flanges of this wheel is similar to that of the out-bound flange B1 wheel in FIG. 3a, except that the outer layer 1010 extends axially inward from each flange and instead of being contoured such that it contacts the primary structural component, it forms a cavity across the entire width of the rim between each flange. In this cavity is located two portions of filler material 107A, between which is located a fastener insert, i.e. nut 5. As in FIG. 7A, the rim 1 is affixed the spokes 3 by means of a bolt 4 that screws into the metal insert 5.

The rim of any of the embodiments described herein may be made by assembling the various component and then bonding them together in a polymer matrix. This may involve assembling the various components in a mould and then bonding them together in a polymer matrix. For example, in the embodiment of FIGS. 1, 2 and 3, the various fabrics (for forming the primary structural component, the bead seat and the outer layer), protective inserts, filler materials, and noodles are assembled in a mould. The fabrics may be pre-impregnated with resin or precursor material that will polymerise to form a resin, and then cured in a mould to form the rim, optionally with spokes, if forming a monoblock or hybrid wheel. In an alternative embodiment, the various fabrics (for forming the primary structural component, the bead seat and the outer layer), protective inserts, filler materials, and noodles are assembled in a mould and a resin (or precursor material for making the resin) applied, either as they are assembled (e.g. in a wet lay-up process or pre-preg process) or after the mould is closed (e.g. in the resin transfer moulding technique) and the rim cured to form the polymer matrix and bind the components together.

Examples

Figure 9:
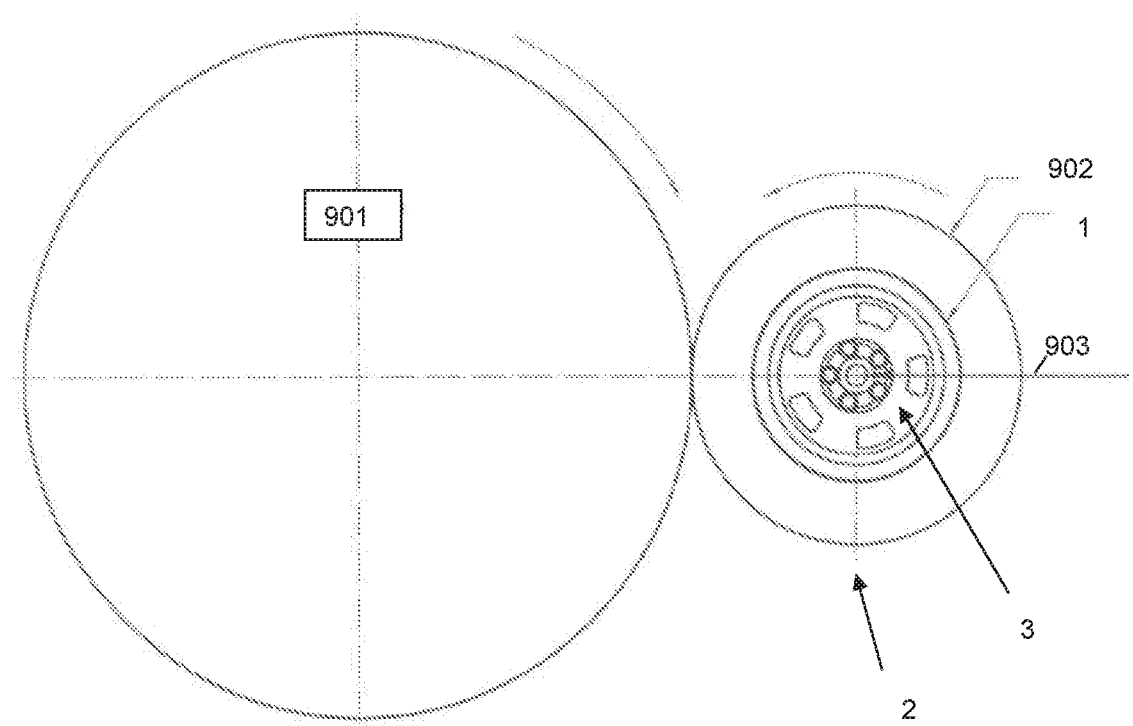
FIG. 9 shows schematically the apparatus used in a radial fatigue test described in the Examples below.

A radial load test was carried out on two different types of wheel: (i) a wheel comprising a rim according to the disclosure (denoted Mk2 design below) and (ii) a reference wheel (denoted Mk1 design below). A schematic illustration of the test equipment is shown in FIG. 9. The test comprises a driven drum 901 on which the test wheel is mounted under a radial load, as shown in FIG. 9; this type of test is normally referred to as a radial fatigue test. In this Figure, the driven drum is denoted 901, the wheel being tested denoted 2, the rim of the wheel denoted 1, the tyre on the wheel denoted 902, the spokes of the wheel denoted 3 and the radial load by an arrow 903. The number of wheel revolutions before failure, defined at the point of tyre deflation or wheel breaking, is recorded. The described test was undertaken in accordance with SAE J328. The test described herein was undertaken using a wheel assembly including a carbon fibre rim (in accordance with the present disclosure) and an intentionally over-engineered aluminium alloy spoke centerpiece. The over-engineered spoke centerpiece was used to determine the full capability of the carbon fibre rim by eliminating the spoke failure mode.

The rim according to the disclosure that was tested had a cross-section substantially as shown in FIG. 1. In this rim, the outer layer 1010 comprised two layers of a plain weave biaxial carbon fibre material, the primary structural component 103 comprised at least four layers of tri-axial woven carbon fibre material, the protective inserts 105 and the filler material 107 comprise a closed-cell foam formed from polymethacrylimide, and the noodles comprise braided carbon-fibre material. The resin used to bind the carbon fibre fabrics together was an epoxy resin. The fibres in the primary structural component were orientated so that one of the axes of the fibres was aligned along the flange-to-flange direction (as shown schematically in FIG. 3B). The fibres of the biaxial plain weave in the outer layer 1010 are orientated so that both axes are at an angle of about 45° to the flange-to-flange direction (as shown schematically in FIG. 3C).

The radial test loads were set at 650 kg for a normal vehicle, 750 kg for a moderately heavy vehicle and 850 kg for a heavy vehicle. A service factor of 2.25 was multiplied onto each wheel rating to calculate the total applied test load. The testing began for the 650 kg rating and ran to 1,000,000 cycles. The same wheel was then tested at 750 kg for a further 1,000,000 cycles. The rating was increased further to 850 kg and the same test wheel ran for an additional 500,000 cycles. To summarise, the single test wheel was subjected to the following: 1,000,000 cycles at a radial load of 650 kg×2.25, 1,000,000 at a radial load of 750 kg×2.25 and 500,000 at a radial load of 850 kg×2.25. The wheel passed the test, showing no damage in the rim upon visual inspection and retaining the initial tyre pressure. The test was terminated as the result was deemed sufficient, though the favourable condition of the wheel suggests it could have withstood even heavier and longer testing.

Figure 10:
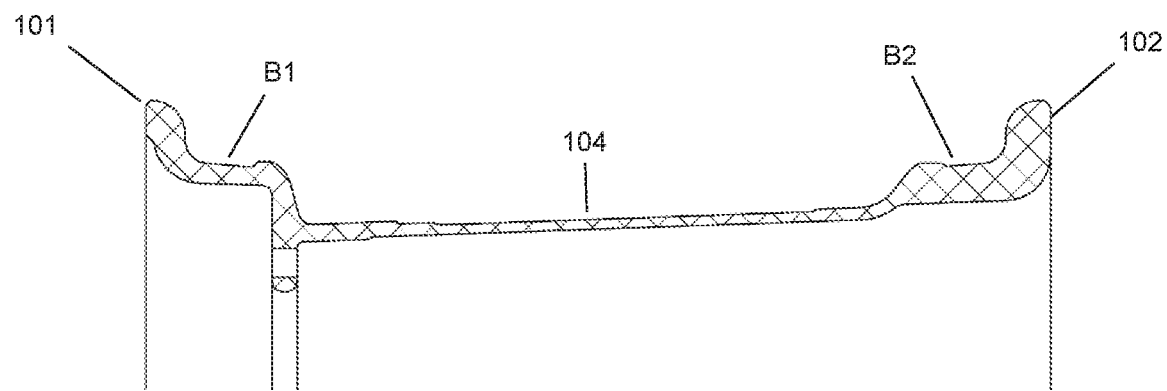
FIG. 10 shows schematically a cross-section of the reference wheel tested in the Examples below.
Figure 11:
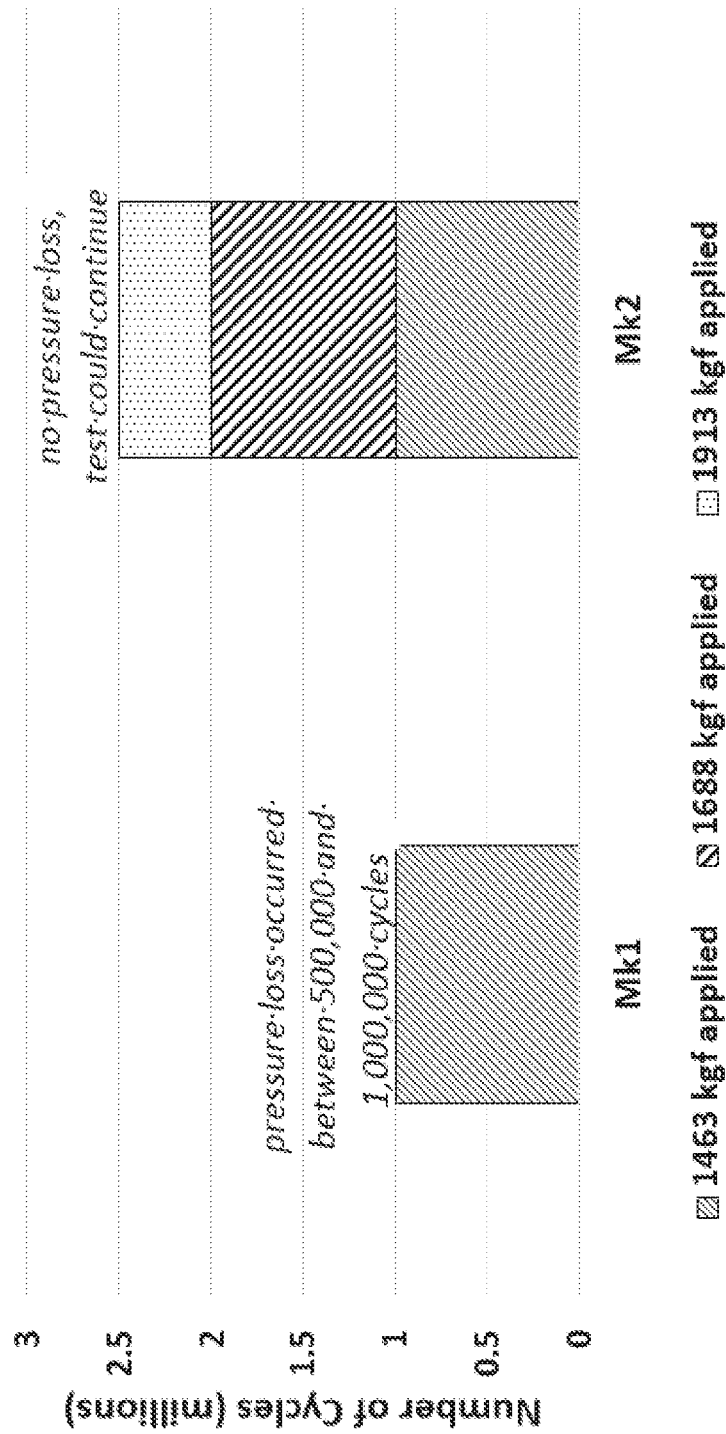
FIG. 11 shows the results of the radial fatigue test carried out on a wheel according to the disclosure (denoted Mk2 in this Figure) and the reference wheel (denoted Mk1 in this Figure).

The carbon fibre rim design (Mk2) described herein represents a significant improvement over a previous carbon fibre rim design (Mk1), which featured a mounting flange on the inside surface. The previous carbon fibre rim (Mk1 design) that was tested is shown schematically, in cross section, in FIG. 10. In this Figure is shown: an outboard flange 101, inboard flange 102, the bead seats B1 and B2, with linking barrel 104. In the Mk1 design, the mounting flange induced an unfavourable stress concentration at its root and significantly increased the difficulty of rim manufacture. In a similar test, at another test house, the Mk1 design wheel was tested at the 650 kg rating for 500,000 cycles with no evidence of rim damage upon visual inspection and without a loss of initial inflation pressure. The rating was maintained and the same wheel ran for an additional 500,000 cycles, totaling 1,000,000 cycles. Between 500,000 and 1,000,000 cycles the wheel began leaking air near the valve hole such that, at 1,000,000 cycles, the inflation pressure had dropped by 20% compared to the initial inflation pressure. These results are illustrated in FIG. 11.

The following Example Embodiments provide illustrative implementations within the scope of this disclosure, however, shall not be construed to limit the scope of the claimed embodiments presented herein. Rather, they are provided to demonstrate some of the many different variations of a few embodiments of the innovation.

Example Embodiment 1

A non-metallic rim for a wheel, the rim comprising:
a barrel having first and second flanges extending radially outward from opposing edges of the barrel, and the barrel comprising a first bead seat and a second bead seat arranged axially inwardly, respectively, of the first and second flanges,
wherein
- a primary structural component extends at least through the first flange and the barrel, the primary structural component being capable of bearing the majority of the radial and/or lateral load that, in use, would be borne by the rim
- a protective insert is disposed between an outer face of the first flange and the primary structural component and/or
- at least a portion of the first bead seat is spaced apart from the primary structural component and
- the primary structural component, bead seat and, if present, the protective insert are bound by a polymer matrix.

Example Embodiment 2

The non-metallic rim according to Example Embodiment 1, wherein a protective insert is disposed between an outer face of the first flange and the primary structural component and at least a portion of the first bead seat is spaced apart from the primary structural component.

Example Embodiment 3

The non-metallic rim according to Example Embodiment 1 or Example Embodiment 2, wherein the rim is for a wheel suitable for a four-wheeled vehicle and first flange is an outboard flange.

Example Embodiment 4

The non-metallic rim according to Example Embodiment 1 or Example Embodiment 2, wherein the rim is for a wheel suitable for a motorbike.

Example Embodiment 5

The non-metallic rim according to Example Embodiment 4, wherein the first flange and the second flange are substantially symmetrical versions of one another.

Example Embodiment 6

The non-metallic rim according to any one of the preceding Example Embodiments, wherein the primary structural component comprises, in the first flange, a substantially vertical section, wherein a 'vertical' direction corresponds to a direction substantially perpendicular to an axial direction defined by the barrel, and above the substantially vertical section is a section that curves outwardly toward a top outward edge of the first flange and below the substantially vertical section is a section that curves underneath the bead seat toward the section of the primary structural component that extends into the barrel.

Example Embodiment 7

The non-metallic rim according to Example Embodiment 6, wherein the protective insert is disposed between the outer face of the first flange and the substantially vertical section of the primary structural component.

Example Embodiment 8

The non-metallic rim according to any one of the preceding Example Embodiments, wherein the primary structural component comprises structural fibres.

Example Embodiment 9

The non-metallic rim according to Example Embodiment 8, wherein at least some of the structural fibres extend through the primary structural component in a direction parallel to an axial direction, when the primary structural component is viewed from a radial direction.

Example Embodiment 10

The non-metallic rim according to Example Embodiment 8 or Example Embodiment 9, wherein the structural fibres are selected from carbon fibres, aramid fibres and glass fibres.

Example Embodiment 11

The non-metallic rim according to any one of Example Embodiments 8 to 10, wherein the structural fibres have been woven, knitted, stitched, braided, wound, stapled or otherwise bound into a fabric.

Example Embodiment 12

The non-metallic rim according to any one of Example Embodiments 7 to 11, wherein the structural fibres are biaxially or tri-axially woven.

Example Embodiment 13

The non-metallic rim according to any one of the preceding Example Embodiments, wherein the rim comprises an outer layer also bound by the polymer matrix, wherein the outer layer forms at least part of the bead seat and/or a covering on the protective insert.

Example Embodiment 14

The non-metallic rim according to Example Embodiment 13, wherein the outer layer comprises structural fibres.

Example Embodiment 15

The non-metallic rim according to Example Embodiment 13 or Example Embodiment 14, wherein the outer layer and the primary structural component each comprise a plurality of fabric layers comprising structural fibres, the primary structural component comprising a greater number of fabric layers than the outer layer.

Example Embodiment 16

The non-metallic rim according to Example Embodiment 15, wherein at least some of the structural fibres of the primary structural component extend through the primary structural component in a direction parallel to an axial direction, when the primary structural component is viewed from a radial direction, and wherein the outer layer substantially lacks fibres that extend in a direction parallel to an axial direction, when the outer layer is viewed from a radial direction.

Example Embodiment 17

The non-metallic rim according to any one of Example Embodiments 13 to 16, wherein the primary structural component comprises a triaxial fabric and the outer layer comprises a biaxial fabric.

Example Embodiment 18

The non-metallic rim according to any one of Example Embodiments 11 to 17, wherein the outer layer extends over an entire side of the barrel closest to the axis of the rim, over the protective insert of the first flange, and, if present, a protective insert of the second flange, over a top outward edge of both of the first and second flanges and axially inward from each of the flanges to form the first and second bead seats, respectively.

Example Embodiment 19

The non-metallic rim according to any one of the preceding Example Embodiments, wherein the protective insert comprises an insert selected from a foam, a honeycomb and a plurality of layers arranged axially with respect to one another, the layers having different stiffnesses to one another.

Example Embodiment 20

The non-metallic rim according to any one of Example Embodiments 13 to 19, wherein the outer layer overlies the protective insert, the outer layer having a different colour to the protective insert or any materials that may be disposed between the outer layer and the protective insert, to provide a visual indication of any damage to the outer layer.

Example Embodiment 21

The non-metallic rim according to any one of the preceding Example Embodiments, wherein a filler material is disposed between the first bead seat and the primary structural component.

Example Embodiment 22

The non-metallic rim according to Example Embodiment 21, wherein the filler material is selected from a foam, a honeycomb and a laminate.

Example Embodiment 23

The non-metallic rim according to Example Embodiment 21 or Example Embodiment 22, wherein an attachment component for attaching a spoke of a wheel to the rim is embedded in the filler material.

Example Embodiment 24

The non-metallic rim according to Example Embodiment 23, wherein the attachment component is a nut or a bolt.

Example Embodiment 25

The non-metallic rim according to Example Embodiment 24, wherein the attachment component is a nut and an aperture is provided in the primary structural component to allow insertion of a bolt into the nut.

Example Embodiment 26

The non-metallic rim according to any one of the preceding Example Embodiments, wherein a filling component is disposed adjacent an end of the primary structural component in the first flange, the filling component running at least part way around the circumference of the rim in the first flange.

Example Embodiment 27

The non-metallic rim according to Example Embodiment 26, wherein the filling component comprises substantially unidirectional fibrous material extending in a circumferential direction around the rim.

Example Embodiment 28

The non-metallic rim according to any one of the preceding Example Embodiments, wherein one or more sensors is/are provided in or adjacent to the protective insert and/or in the between the bead seat and the primary structural component, to send a signal to a receiver with information about the rim or any tire disposed thereon.

Example Embodiment 29

The non-metallic rim according to Example Embodiment 28, wherein the one or more sensors send(s) information to a receiver about any damage to the protective insert and/or any layer covering the protective insert.

Example Embodiment 30

A wheel comprising the rim according to any one of the preceding Example Embodiments.

Example Embodiment 31

A wheel according to Example Embodiment 30, wherein the wheel is for a four-wheeled vehicle and the first flange is an outboard flange of the wheel.

Example Embodiment 32

A wheel according to Example Embodiment 31, wherein the four-wheeled vehicle is a car.

Example Embodiment 33

A wheel according to Example Embodiment 30, wherein the wheel is for a motorbike.

Example Embodiment 34

A vehicle comprising a wheel according to any one of Example Embodiments 30 to 33.

Example Embodiment 35

A method for making a rim according to any one of Example Embodiments 1 to 29, the method comprising assembling the primary structural component, bead seat and, if present, the protective insert, and any other optional components of the rim, such as a filler material, and binding them together in a polymer matrix.

Example Embodiment 36

The method according to Example Embodiment 35, the method comprises using pre-impregnated into fibre materials or cloths for the primary structural component and/or the bead seat.

Example Embodiment 37

The method according to Example Embodiment 35, wherein the method involves a wet lay-up process.

Example Embodiment 38

The method according to Example Embodiment 35, the method involving resin transfer moulding.

We claim:

1. A non-metallic rim for a wheel suitable for a 4-wheeled vehicle or a motorbike, the rim comprising:
   a barrel;
   a first flange and a second flange, each extending radially outward from opposing edges of the barrel;
   a first bead seat and a second bead seat, each arranged axially inwardly, respectively, of the first and second flanges;
   a primary structural component comprising carbon fibres and configured to extend into at least the first flange and the barrel, and being capable of bearing the majority of at least one load borne by the rim during normal usage selected from the group consisting of: radial load, lateral load, and combinations thereof, wherein the primary structural component and the bead seats are bound by a polymer matrix, and
   (a) a protective insert disposed between an axial outer face of the first flange and the primary structural component, the protective insert comprising a non-carbon-fibre material that acts to absorb and/or deflect and/or dissipate energy from a load or impact applied axially and/or radially to the rim, wherein the rim comprises an outer layer also bound by the polymer matrix, wherein the outer layer forms a covering on the protective insert and the outer layer comprises carbon fibres; and
   (b) wherein at least a portion of the first bead seat is spaced apart from the primary structural component, and the outer layer forms at least part of the bead seat, a non-carbon fibre filler material is disposed between the first bead seat and at least part of the primal structural component and wherein the filler material acts to absorb and/or deflect and/or dissipate energy from a load or impact applied axially and/or radially to the rim, and wherein either:
   (i) the primary structural component, in the first flange, splits in the area under the bead seat, and the filler material is located in a cavity formed by the split, and a portion of the primary structural component disposed most radially outward forms part of the bead seat, together with the outer layer, and the filler material is located between this portion and a portion of the primary structural component located most radially inward; or
   (ii) the outer layer forms the head seat with the resin and the bead seat does not include carbon fibres of the primary structural component.

2. The non-metallic rim according to claim 1, wherein the primary structural component comprises a substantially vertical section extending a direction substantially perpendicular to an axial direction defined by the barrel, and above the substantially vertical section is a section that curves outwardly toward a top outward edge of the first flange and below the substantially vertical section is a section that curves underneath the bead seat toward a section of the primary structural component that extends into the barrel.

3. The non-metallic rim according to claim 2, wherein the protective insert is disposed between the outer face of the first flange and the substantially vertical section of the primary structural component.

4. The non-metallic rim according to claim 1, wherein the carbon fibres extend through the primary structural component in a direction parallel to an axial direction with respect to the barrel, when the primary structural component is viewed from a radial direction with respect to the barrel.

5. The non-metallic rim according to claim 1, wherein the carbon fibres are at least one of: biaxially woven and tri-axially woven.

6. The non-metallic rim according to claim 1, wherein the outer layer and the primary structural component each comprise a plurality of fabric layers comprising carbon fibres, the primary structural component comprising a greater number of fabric layers than the outer layer.

7. The non-metallic rim according to claim 6, wherein at least some of the carbon fibres of the primary structural component extend through the primary structural component in a direction parallel to an axial direction, when the primary structural component is viewed from a radial direction, and wherein the outer layer substantially lacks fibres that extend in a direction parallel to an axial direction, when the outer layer is viewed from a radial direction.

8. The non-metallic rim according to claim 1, wherein the primary structural component comprises a triaxial fabric and the outer layer comprises a biaxial fabric.

9. The non-metallic rim according to claim 1, wherein the outer layer extends over an entire side of the barrel adjacent to the axis of the rim, over the protective insert of the first flange, and, if present, a protective insert of the second flange, over a top outward edge of both of the first and second flanges and axially inward from each of the flanges to form the first and second bead seats, respectively.

10. The non-metallic rim according to claim 1, wherein the protective insert comprises an insert selected from at least one of: a foam, a honeycomb and a plurality of layers arranged axially with respect to one another in which the layers have different relative stiffnesses to one another.

11. The non-metallic rim according to claim 1, wherein the outer layer overlies the protective insert, the outer layer having a different color with respect to at least one of: the protective insert and any materials that may be disposed between the outer layer and the protective insert, wherein the different color is provided to exhibit a visual indication of damage to the outer layer.

12. The non-metallic rim according to claim 1, wherein the filler material is selected from a foam, a honeycomb and a laminate.

13. The non-metallic rim according to claim 1, wherein a filling component is disposed adjacent an end of the primary structural component in the first flange, the filling component running at least part way around the circumference of the rim in the first flange.

14. The non-metallic rim according to claim 13, wherein the filling component comprises substantially unidirectional fibrous material extending in a circumferential direction around the rim.

15. A wheel suitable for a 4-wheeled vehicle or a motorbike comprising:
   center member; and
   a rim, the rim comprising:
      a barrel;
      a first flange and a second flange, each extending radially outward from opposing edges of the barrel;
      a first bead seat and a second bead seat, each arranged axially inwardly, respectively, of the first and second flanges;
      a primary structural component configured to extend into at least the first flange and the barrel, and being capable of bearing the majority of at least one load borne by the rim during normal usage selected from the group consisting of: radial load, lateral load, and combinations thereof;
      wherein
      the primary structural component and the bead seats are bound by a polymer matrix, and
   (a) a protective insert disposed between an axial outer face of the first flange and the primary structural component, the protective insert comprising a non-carbon-fibre material that acts to absorb and/or deflect and/or dissipate energy from a load or impact applied axially and/or radially to the rim, wherein the rim comprises an outer layer also bound by the polymer matrix, wherein the outer layer forms a covering on the protective insert and the outer layer comprises carbon fibres, and
   (b) wherein at least a portion of the first bead seat is spaced apart from the primary structural component, and the outer layer forms at least part of the bead seat, a non-carbon fibre filler material is disposed between the first bead seat and at least part of the primary structural component and wherein the filler material acts to absorb and/or deflect and/or dissipate energy from a load or impact applied axially and/or radially to the rim, and wherein either:
   (i) the primary structural component, in the first flange, splits in the area under the bead seat, and the filler material is located in a cavity formed by the split, and a portion of the primary structural component disposed most radially outward forms part of the bead seat, together with the outer layer, and the filler material is located between this portion and a portion of the primary structural component located most radially inward; or
   (ii) the outer layer forms the bead seat with the resin and the bead seat does not include carbon fibres of the primary structural component.

16. A method for making a non-metallic rim for a wheel suitable for a 4-wheeled vehicle or a motorbike, the method comprising:
   assembling a primary structural component with a first bead seat, a second bead seat and, a protective insert, a filler material and an outer layer; and
      binding the primary structural component, bead seats, protective insert, filler material and outer layer together in a polymer matrix to form a rim comprising a barrel, a first flange and a second flange, each flange extending radially outward from opposing edges of the barrel, the first bead seat and the second bead seat, each arranged axially inwardly, respectively, of the first and second flanges;
   the primary structural component comprising carbon fibres and configured to extend into at least the first flange and the barrel, and being capable of bearing the majority of at least one load borne by the rim during normal usage selected from the group consisting of: radial load, lateral load, and combinations thereof, wherein
   (a) the protective insert is disposed between an outer face of the first flange and the primary structural component, the protective insert comprising a non-carbon-fibre material that acts to absorb and/or deflect and/or dissipate energy from a load or impact applied axially and/or radially to the rim, wherein the rim comprises an outer layer also bound by the polymer matrix, wherein the outer layer forms a covering on the protective insert and the outer layer comprises carbon fibres; and
   (b) at least a portion of the first bead seat is spaced apart from the primary structural component, and the outer layer forms at least part of the bead seat, the filler material, which is a non-carbon fibre filler material, is disposed between the first bead seat and at least part of the primary structural component and wherein the filler material acts to absorb and/or deflect and/or dissipate energy from a load or impact applied axially and/or radially to the rim, and wherein either:
   (i) the primary structural component, in the first flange, splits in the area under the bead seat, and the filler material is located in a cavity formed by the split, and a portion of the primary structural component disposed most radially outward forms part of the bead seat, together with the outer layer, and the filler material is located between this portion and a portion of the primary structural component located most radially inward; or
   (ii) the outer layer forms the bead seat with the resin and the bead seat does not include carbon fibres of the primary structural component.

* * * * *